United States Patent
Mikuni et al.

(10) Patent No.: US 6,400,704 B2
(45) Date of Patent: Jun. 4, 2002

(54) CONTROL CHANNEL PLACEMENT METHOD

(75) Inventors: Yuko Mikuni; Takashi Kawabata; Norihiko Toyota, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/745,425

(22) Filed: Dec. 26, 2000

Related U.S. Application Data

(63) Continuation of application No. PCT/JP00/01145, filed on Feb. 28, 2000.

(30) Foreign Application Priority Data

Apr. 26, 1999 (JP) ............................................ 11-118010

(51) Int. Cl.[7] .............................. H04J 3/16; H04B 1/06
(52) U.S. Cl. ................... 370/347; 370/348; 455/277.2; 455/450
(58) Field of Search ................................ 370/276, 277, 370/337, 329, 341, 345, 347, 348; 455/260, 273, 277.2, 450, 451, 452, 502, 509

(56) References Cited

U.S. PATENT DOCUMENTS

| | | | |
|---|---|---|---|
| 5,802,046 A | * | 9/1998 | Scott .......................... 370/280 |
| 6,061,553 A | * | 5/2000 | Matsuoka et al. ........... 455/273 |
| 6,275,486 B1 | * | 8/2001 | Edwards et al. ............ 370/347 |

FOREIGN PATENT DOCUMENTS

| | | |
|---|---|---|
| EP | 0 841 826 | 5/1998 |
| JP | 07-193857 | 7/1995 |
| JP | 07-245780 | 9/1995 |
| JP | 07-245784 | 9/1995 |
| JP | 07-264659 | 10/1995 |
| JP | 10-155181 | 6/1998 |

* cited by examiner

*Primary Examiner*—Alpus H. Hsu
*Assistant Examiner*—Afsar M. Qureshi
(74) *Attorney, Agent, or Firm*—Oblon, Spivak, McClelland, Maier & Neustadt, P.C.

(57) ABSTRACT

A first sector cell is set as an object for measurement (S101). Reception levels in each time slot in the number of TDMA-TDD frames is measured for the object cell (S102) and for all the cells (S103 and S105). The results of the measurement of a specific sector cell are added to the results of the measurement of a sector cell opposite the specific sector cell, and time slots in which control channels can be placed are extracted for each sector cell (S106 to S108). TDMA-TDD frames are then allocated such that the control channels of each sector cell coincide with time slots in which control channels can be placed (S109). In this way, control channels are placed in time slots such that a base station having a sector cell structure avoids interference from the same frequency.

11 Claims, 14 Drawing Sheets

FIG. 1
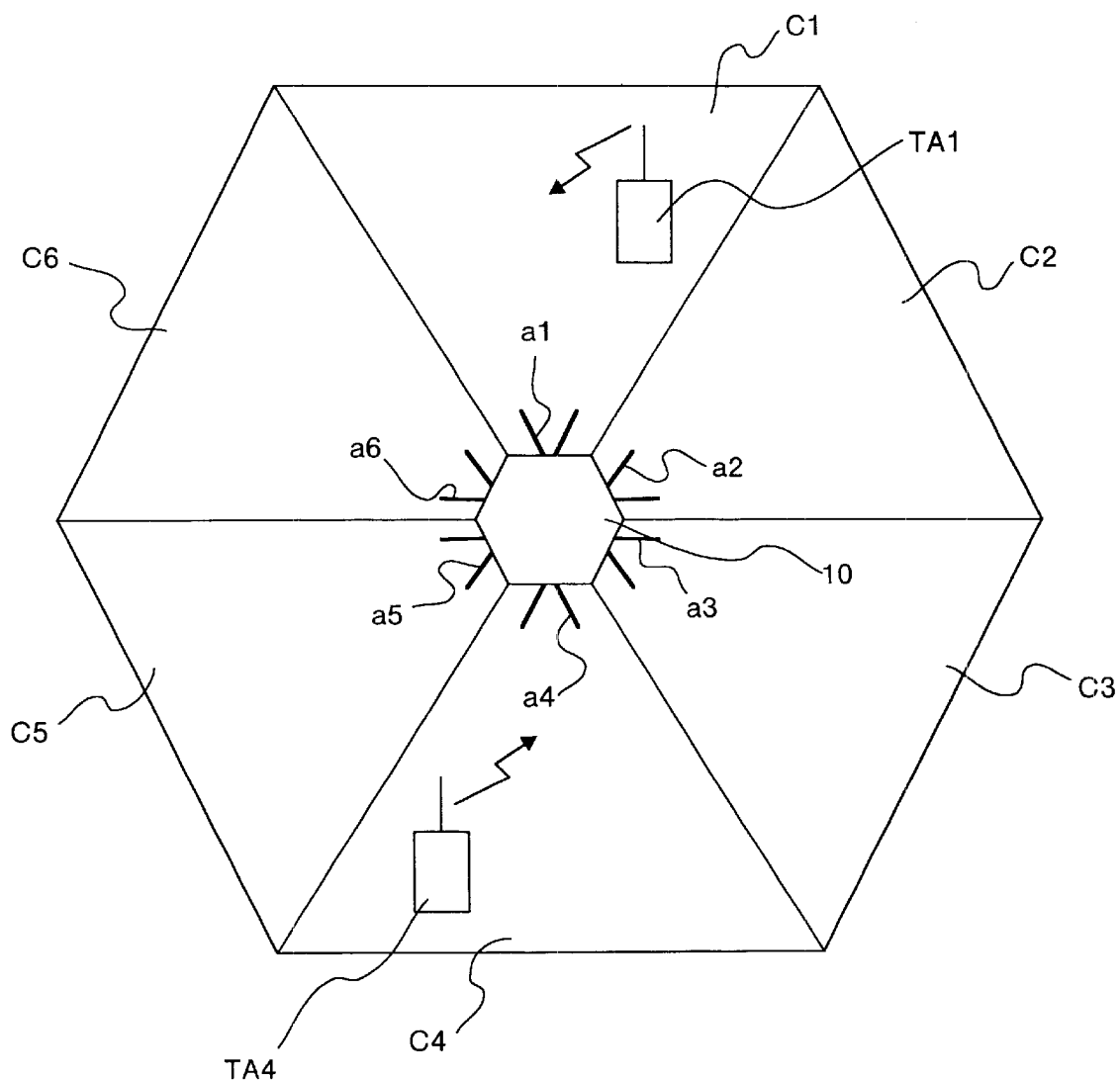
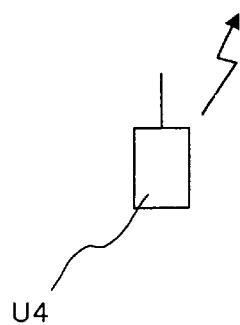

FIG. 3

| SECTOR CELL | OPPOSITE SECTOR CELL |
|---|---|
| C1 | C4 |
| C2 | C5 |
| C3 | C6 |
| C4 | C1 |
| C5 | C2 |
| C6 | C3 |

CONTROL CHANNEL PLACEMENT METHOD

This application is a continuation of PCT/JP00/01145 filed Feb. 28, 2000.

BACKGROUND OF THE INVENTION

1. Technical Field

The present invention relates to a control channel placement method in which control channels for establishing wireless communication between a base station and a terminal station in a wireless communication system are placed in optimal time slots within a TDMA-TDD frame. The terminal station could be a vehicle telephone, a portable telephone or the like.

2. Discussion of the Background

A cellular system is generally used for providing a communication service for vehicle telephones or portable telephones. This cellular system comprises a plurality of base stations and small zones (referred to hereafter as cells) around each base station. The cells are so constructed that there is no gap between then.

In the cellular system, same channel is repeatedly used in zones under the condition that no mutual interference obstruction is generated. Therefore, it is possible provides a service in a very wide area with less number of channels. When the antenna of the base station is non-directional within the horizontal plane, and if the effects of topography and ground based obstructions are ignored, then the shape of the area covered by each base station will be circular. These circular cells are called omnicells. Switching of channels is performed in the portions where adjacent omnicells overlap.

On the other hand, sector cell structure zones are also known. In case of sector cell structure zones, directional antennas are provided in each base station. The beam width of each antenna is set so as to divide a circular area into a plurality of fan-shaped cells (referred to hereafter as sector cells) each having the same size.

Since directional antennas are used, it is possible to remove the effect of interference waves that arrive from directions other than the direction to which the antenna is pointed. In addition, there is no possibility of interfering waves broadcast towards base stations using the same channel but situated in a direction other than the one to which the antenna is pointed. As a result, it is possible to decrease the distance between base stations to which the same channel has been allocated and to improve the spatial channel usage efficiency. Moreover, the overall channel usage efficiency is improved in comparison with omnicells using non-directional antennas.

Because of reasons such as this, in wireless communication systems for performing mobile communication such as vehicle telephones and portable telephones, as the number of users increases, there is currently a transition underway from employing a zone structure that uses omnicells having a small radius to employing a zone structure that uses sector cells.

In the meanwhile, time division multiple access (TDMA) mode is known as the representative mode among digital wireless access modes employed in vehicle telephones and portable telephones. In TDMA mode, signals having a predetermined frequency bandwidth are divided along a time axis and communication is performed by cyclically allocating the divided time band to each user as one channel. Using this TDMA mode, a user can perform communication in time slots allocated into short cycles in the same frequency having a predetermined bandwidth.

The characteristics of this TDMA mode are described below. Firstly, a plurality of users can perform communication simultaneously using a single transreceiving device, therefore, the base station can be constructed with a small size and at a low cost. Secondly, open time is generated because the communication time only needs to be the time of the allocated time slot, thus allowing the state of peripheral bands to be observed at this time. Thirdly, because the operating time during communication is intermittent, the power consumption in the terminal station can be reduced.

Furthermore, when the TDMA mode is employed as a wireless access mode, it is possible to use the time division duplex (TDD) mode in combination with the TDMA mode. The TDD mode uses the same frequency for both, reception and transmission, between a terminal station and a base station and performs the transmission and reception by dividing the time. In the TDD mode, the characteristics of the wave propagation are the same going "up" (i.e. from the terminal station to the base station) as they are going "down" (i.e. from the base station to the terminal station). Therefore, it is possible to only have to carry out countermeasures against variations in the wave propagation at the base station side only.

The frame structure of the transmission and reception using this TDMA-TDD may be one structured, for example, from four pairs of time slots (one up and one down). In this case, the first pair is used as a control channel with the remaining three pairs being used as notification channels. As a result, in this example, three terminal stations can perform communication with one base station at the same time.

In this case, it is possible to divide the control channels into "down control channels" going in the direction from the base station to the terminal station and "up control channels" going in the direction from the terminal station to the base station. The down control channels are formed from a broadcast channel (BCCH) for notifying a terminal station as to the ID of the host base station and about information peculiar to the base station such as the control channel frequencies of peripheral base stations and the like, and from a paging channel (PCH) for transmitting incoming message information, and the like.

The up control channels are formed from a random access type of signal control channel (SCCH) for performing tasks such as receiving transmissions and specifying wireless channels. FIG. 14 is an explanatory diagram showing the frame structure in a conventional TDMA-TDD mode. In FIG. 14, in accordance with the above example, four pairs of time slots comprising up and down are set as one TDMA-TDD frame.

In particular, in this example, the up control channel is a multiframe structure in which 20 frames are set as one new frame, while the down control channel is a super frame structure in which 12 multiframes are set as one new frame.

The TDMA-TDD mode has commonly been applied as a wireless access mode in portable telephones and vehicle telephones. Various control channel setting methods which should be able to realize higher quality communication are provided in a wireless communication system that employs this TDMA-TDD mode.

For example, according to the "Control Channel Setting Method" disclosed in Japanese Patent Application Laid-Open (JP-A) No. 7-245780, in order to reduce interference in its own down control channel, a parent station (a base station) measures the reception levels of all channels of frequencies used for control signals (control channels), and selects, for setting as control channels, usable combinations from the reception levels of each channel from among combinations of up control channels and down control channels that form pairs in the TDMA-TDD mode, such that up control channels and down control channels of peripheral base stations do not overlap.

As another example, according to the "Radio Control System" explained in U.S. patent application No. 09/236, 392, by the same assignee as the present application in the wireless communication system of a sector cell zone structure that uses directional antennas, when a particular base station performs communication, interference is reduced by not using antennas transmitting in the same direction as the antennas used for communication by base stations adjacent to that particular base station, based on tables that have been prepared in advance.

Moreover, as the channel allocation method, a fixed channel allocation method may be used in which the channels to be used by each cell are fixed in advance with consideration given to mutual interference between zones. Alternatively, a dynamic channel allocation method in which the channel allocation is changed time-wise in accordance with the demands of the calls in each cell may be used.

In the channel allocation method, in particular, a specific channel that can be used by the base station is selected for each communication from among all the channels. The carrier to interference (CI) wave strength ratio is then measured for the selected channel thereby allowing the reception levels of the carrier and interference waves to be detected. A determination is then made as to whether or not that channel can be allocated.

In the dynamic channel allocation method it is possible to respond flexibly in the channel allocation to variations in the voice level that occur overtime. Therefore, the efficiency of the utilization of the frequencies is better in the dynamic channel allocation method than in the fixed channel allocation method. Accordingly, in a wireless communication system, by combining a dynamic channel allocation method with the sector cell zone structure, a remarkable improvement in the efficiency of the utilization of the frequencies can be achieved.

However, the "Control Channel Setting Method" disclosed in JP-A No. 7-245780 is intended to reduce interference in control channels between a terminal station and a plurality of base stations in an omnicell zone structure, and it is not able to reduce interference in control channels allocated to each sector for a base station having a sector cell structure.

Furthermore, although the "Radio Communication System" according to the above-mentioned U.S. patent application No. 09/236,392 is designed to reduce interference between adjacent base stations, in order to achieve that, it does not alter the placement of the control channels, and is not able to solve interference problems when communication is performed simultaneously by a plurality of terminal stations.

Moreover, when the dynamic channel allocation method is used, if the carrier to interference ratio of a candidate allocation channel is above a predetermined threshold value, that channel will be allocated, however, the possibility will exist that the allocation will generate interference obstruction in surrounding terminal stations or base stations that are communicating using the same channel. In addition, if the base stations have a sector cell structure, because the amount of interference received by each cell is changed by differences in the timing of the channel allocation, it has not been possible to obtain a constantly high quality communication state.

In particular, in a sector cell structure using directional antennas having a directionality of 60° within a regular hexagonal shaped cell, namely, in a base station having 6 sector cells, because the sector cells are opposite each other, cases arise in which the direction of waves transmitted to a terminal station by one sector cell match the direction of waves received from the terminal station by the sector cell in the opposite position, thereby generating interference between the two.

Moreover, when it is only possible to place one control channel in one cycle (the number of TDMA-TDD frames extending for the number of sectors), there are times when it is not possible to place control channels at fixed time slot positions inside the TDMA-TDD frame of one cycle. In this case, interference and the like is generated after communication is established, and when reception in the control channel becomes impossible, it is necessary to reallocate the TDMA-TDD frames.

SUMMARY OF THE INVENTION

It is an object of the present invention to provide a method for placing control channels which sets high quality wireless channels in a wireless communication system employing the TDMA-TDD mode by placing control channels in suitable time slots so that interference from an identical frequency can be avoided.

According to the control channel placement method of the present invention, in a wireless communication system in which a base station having directional antennas that match placement angles of a plurality of sector cells performs communication in a TDMA-TDD mode with a plurality of terminal stations, up and down control channels for establishing communication by the base station with the terminal stations in each sector cell are placed in predetermined time slot positions within TDMA-TDD frames, comprising: a reception level measurement step in which a reception level of each time slot extending over TDMA-TDD frames corresponding to the number of sector cells of the base station is measured in each of the sector cells; a time slot extraction step in which time slots in which control channels can be placed are extracted from among the time slots extending over the TDMA-TDD frames corresponding to the number of sector cells, using a result of the measurement of the reception level in the reception level measurement step when a first sector cell was measured, and a result of the measurement of the reception level in the reception level measurement step when a second sector cell in a position opposite the first sector cell was measured from among the sector cells; and a frame allocation step in which the TDMA-TDD frames are allocated for each sector cell such that those predetermined time slot positions in which control channels are placed, from among the time slots within the TDMA-TDD frames, are matched with time slots extracted in the time slot extraction step.

According to the above invention, in a wireless communication system employing the TDMA-TDD mode as a wireless access mode and employing sector cells as the zone structure, when a base station having a plurality of sector cells performs a transmission with both up control channels and down control channels placed in predetermined time slot positions within the TDMA-TDD frames for each sector cell, the reception level in each time slot extending across the TDMA-TDD frames corresponding to the number of sector cells of the base station is measured in the reception level measurement step. Next, in the time slot extraction step, time slots in which it is possible for control channels to be placed are extracted from among the time slots extending across the TDMA-TDD frames corresponding to the number of sector cells, using the result of the measurement of the reception level when the first sector cell was measured, and the result of the measurement of the reception level when the second sector cell at a position opposite the first sector cell was measured from among all the sector cells in the same base station. Finally, in the frame allocation step, the TDMA-TDD frames are allocated for each sector cell such that those predetermined time slot positions in which control channels are placed, from among the time slots within the TDMA-TDD frames, are matched with the time slots extracted in the time slot extraction step. As a result, both the up control channels and the down control channels can be placed simultaneously in optimum time slot positions.

Moreover, according to the control channel placement method of the present invention, in the above control channel placement method, in the time slot extraction step, a time slot in which a reception level measured in the first sector cell in the reception level measurement step is equal to or less than a predetermined value, and in which a reception level measured in the second sector cell in the reception level measurement step is equal to or less than a predetermined value, is determined to be a time slot in which the control channel can be placed in the first sector cell.

According to the above invention, the time slot extraction step specifies those time slots, from among the time slots within TDMA-TDD frames extending for the number of sector cells, whose reception level in a first sector cell measured in the reception level measurement step is a predetermined threshold value or less. The time slot extraction step then determines that, out of the specified time slots, those time slots whose measurement result in a second sector cell (i.e. the sector cell located opposite the first sector cell) measured in the reception level measurement step is a predetermined threshold value or less are time slots in which control channels can be placed in the first sector cell. As a result, it is possible to remove time slot positions that are in an unstable state due to interference and the like from being candidates for the placement of an up control channel or a down control channel.

Moreover, according to the control channel placement method of the present invention, in the above control channel placement method, in the time slot extraction step, time slots in which control channels can be placed in the first sector cell are determined in sequence starting from the time slot in which a value, determined by combining a reception level obtained in the reception level measurement step by measuring the first sector cell with a reception level obtained in the reception level measurement step by measuring the second sector cell, is at the minimum.

According to the above invention, the time slot extraction step adds the result of measuring the reception level in the second sector cell (i.e. the sector cell located opposite the first sector cell) to the result of measuring the reception level in the first sector cell measured in the reception level measurement step, and determines the time slots in which control channels can be placed in the first sector cell in sequence starting from that time slot in which the value obtained from the above addition is at the minimum. Therefore, it is possible to allocate time slot positions giving a more stable state of communication as the positions for placing up control channels and down control channels.

Moreover, according to the control channel placement method of the present invention, in the above control channel placement method, the TDMA-TDD frames are formed by securing a plurality of time slot positions in which up control channels can be placed and a plurality of time slot positions in which down control channels can be placed and by placing in the plurality of time slot positions control channels of sector cells that are different from each other, and wherein, in the frame allocation step, within TDMA-TDD frames extending for the number of the sector cells, specific TDMA-TDD frames are allocated such that time slots extracted in the time slot extraction step coincide with either one of time slot positions for the placement of the control channels within the specific TDMA-TDD frames determined for each of the sector cells and time slot positions for the placement of the control channels within other TDMA-TDD frames different to the specific TDMA-TDD frames.

According to the above invention, the TDMA-TDD frames are formed by securing a plurality of time slots positions for the respective placement of up control channels and down control channels and by placing control channels for sector cells that are different from each other in the plurality of time slot positions. When the frame allocation step allocates specific TDMA-TDD frames (namely, TDMA-TDD frames corresponding to specific sector cells), there is a prerequisite that, within TDMA-TDD frames extending for the number of the sector cells, time slots extracted in the time slot extraction step coincide with one of either time slot positions for the placement of the above control channels within the specific TDMA-TDD frames and time slot positions for the placement of the above control channels within other TDMA-TDD frames different to the specific TDMA-TDD frames. Therefore, it is possible to choose from a plurality of control channel placement positions spread across the number of TDMA-TDD frames corresponding to the number of sector cells in order to allocate TDMA-TDD frames for one sector cell.

Moreover, according to the control channel placement method of the present invention, in the above control channel placement method, the TDMA-TDD frames are formed by securing a plurality of time slot positions in which up control channels can be placed and a plurality of time slot positions in which down control channels can be placed and, based on a reception level measurement result measured in the reception level measurement step, control channels of sector cells that are different from each other are placed in a plurality of time slot positions for the placement of the control channels, and wherein, in the frame allocation step, within TDMA-TDD frames extending for the number of the sector cells, specific TDMA-TDD frames are allocated such that time slots extracted in the time slot extraction step coincide with either one of time slot positions for the placement of the control channels within the specific TDMA-TDD frames determined for each of the sector cells and time slot positions for the placement of the control channels within other TDMA-TDD frames different to the specific TDMA-TDD frames.

According to the above invention, the TDMA-TDD frames are formed by securing a plurality of time slot positions for the placement of up control channels and down control channels and, based on a reception level measurement result measured in the reception level measurement step, by placing control channels for sector cells that are different from each other in each of the plurality of time slot positions. When the frame allocation step allocates specific TDMA-TDD frames (namely, TDMA-TDD frames corresponding to specific sector cells), there is a prerequisite that, within TDMA-TDD frames extending for the number of the sector cells, time slots extracted in the time slot extraction step coincide with one of either time slot positions for the placement of the above control channels within the specific TDMA-TDD frames and time slot positions for the placement of the above control channels within other TDMA-TDD frames different to the specific TDMA-TDD frames. Therefore, it is possible to choose from a plurality of control channel placement positions spread across the number of TDMA-TDD frames corresponding to the number of sector cells in order to allocate TDMA-TDD frames for one sector cell.

Moreover, according to the control channel placement method of the present invention, in the above control channel placement method, there is included a reception level remeasurement step for measuring, at regular intervals and for each of the sector cells, reception levels of time slots in which control channels have been placed in the frame allocation step; and a frame reallocation step for performing the frame allocation step when a reception level measured in the reception level remeasurement step is at a predetermined threshold level or greater.

According to the above invention, in a wireless communication system that employs a TDMA-TDD mode for the wireless access mode and employs sector cells for the zone structure, when a base station having a plurality of sector cells performs transmission by placing both up control channels and down control channels at predetermined time slot positions within the TDMA-TDD frames in each sector cell, the reception level in each time slot extending for the number of TDMA-TDD frames corresponding to the number of sector cells of the base station is measured in the reception level measurement step. Next, in the time slot extraction step, time slots in which control channels can be placed are extracted from among the time slots that extend across TDMA-TDD frames of the number of sector cells using the result of the measurement of the reception levels measured in a first sector cell and the result of the measurement of the reception levels measured in a second sector cell that is located opposite the first sector cell from among all the sector cells in the same base station. Next, with communication having been established as a result of TDMA-TDD frames allocated in each sector cell in the frame allocation step such that time slots extracted in the time slot extraction step coincide with predetermined time slot positions for the placement of control channels from among the time slots within the TDMA-TDD frames, the reception level remeasurement step measures at regular intervals the reception levels of time slots in which control channels have been placed in each sector cell. If the result of this reception level measurement is equal to or greater than a predetermined threshold, the frame reallocation step performs the frame allocation step once again. As a result of the above, it is possible to avoid deterioration in the quality of communication caused by interference obstruction generated while communication is established.

Moreover, according to the control channel placement method of the present invention, in the above control channel placement method, the frame allocation step performed in the frame reallocation step allocates the TDMA-TDD frame to a position shifted by one time slot towards the front or rear.

According to the above invention, because the above frame allocation step performed in the frame reallocation step allocates the TDMA-TDD frame to a position shifted by one time slot towards the front or rear, by attempting to establish communication each time by shifting the reallocation of the TDMA-TDD frames by one time slot forwards or backwards, it is possible to omit the calculation to search for time slots in which control channels can be placed. At the same time, it is possible to keep the time when communication cannot be established to the minimum.

Moreover, according to the control channel placement method of the present invention, in the above control channel placement method, in the reception level remeasurement step, the carrier to interference wave strength ratio is measured from the reception levels and, in the frame reallocation step, the frame reallocation step is performed when the carrier to interference wave strength ratio measured in the reception level remeasurement step is equal to or greater than a predetermined threshold.

According to the above invention, because the carrier to interference wave strength ratio is acquired from the reception levels measured in the reception level remeasurement step, and the frame reallocation step is able to perform frame reallocation in accordance with this carrier to interference wave strength ratio, it is possible to accurately determine whether or not a control channel is receiving interference obstruction.

Moreover, according to the control channel placement method of the present invention, in the above control channel placement method, in the reception level remeasurement step, the carrier to interference wave strength ratio is measured from the reception level when the time slot being measured is in a blocked state and, in the frame reallocation step, the frame reallocation step is performed when the carrier to interference wave strength ratio measured in the reception level remeasurement step is equal to or greater than a predetermined threshold.

According to the above invention, because the carrier to interference wave strength ratio is acquired from the reception levels measured in the reception level remeasurement step when the time slots being measured are in a blocked state, and the frame reallocation step is able to perform frame reallocation in accordance with this carrier to interference wave strength ratio, it is possible to accurately determine whether or not variations in the reception level in a control channel are only caused by interference obstruction.

Moreover, according to the control channel placement method of the present invention, in the above control channel placement method, in the frame reallocation step, if the carrier to interference wave strength ratio measured in the reception level remeasurement step continues to be equal to or greater than a predetermined threshold for a predetermined length of time, then a determination is made that the time slot being measured is receiving interference obstruction and the frame allocation step is performed.

According to the above invention, because the frame reallocation step is able to determine that the time slot being measured is receiving interference obstruction if the measured carrier to interference wave strength ratio continues to be equal to or greater than a predetermined threshold for a predetermined length of time, and then perform the frame allocation step, it is possible to accurately determine whether variations in the reception level are caused by collisions in the up control channels or by interference obstruction.

Moreover, according to the control channel placement method of the present invention, in the above control channel placement method, in the reception level remeasurement step, an error detection ratio in an up control channel is measured as a reception level and, in the frame reallocation step, if the error detection ratio measured in the reception level remeasurement step is equal to or greater than a predetermined threshold, the frame allocation step is performed.

According to the above invention, because the error detection ratio in the up control channel can be measured in the reception level remeasurement step and the frame reallocation step can perform the frame allocation step in accordance with this error detection ratio, it is possible to determine whether the usage of the time slot of a control channel has become difficult or impossible.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drwaings, wherein:

FIG. 1 is an explanatory diagram showing the sector cell structure of a base station in which the control channel placement method according to the first embodiment is applied;

FIG. 3 is an explanatory diagram showing the reciprocal relationship between each sector cell and it's opposite sector cell in the control channel placement method according the first embodiment;

DESCRIPTION OF THE PREFERRED EMBODIMENTS

Figure 2:
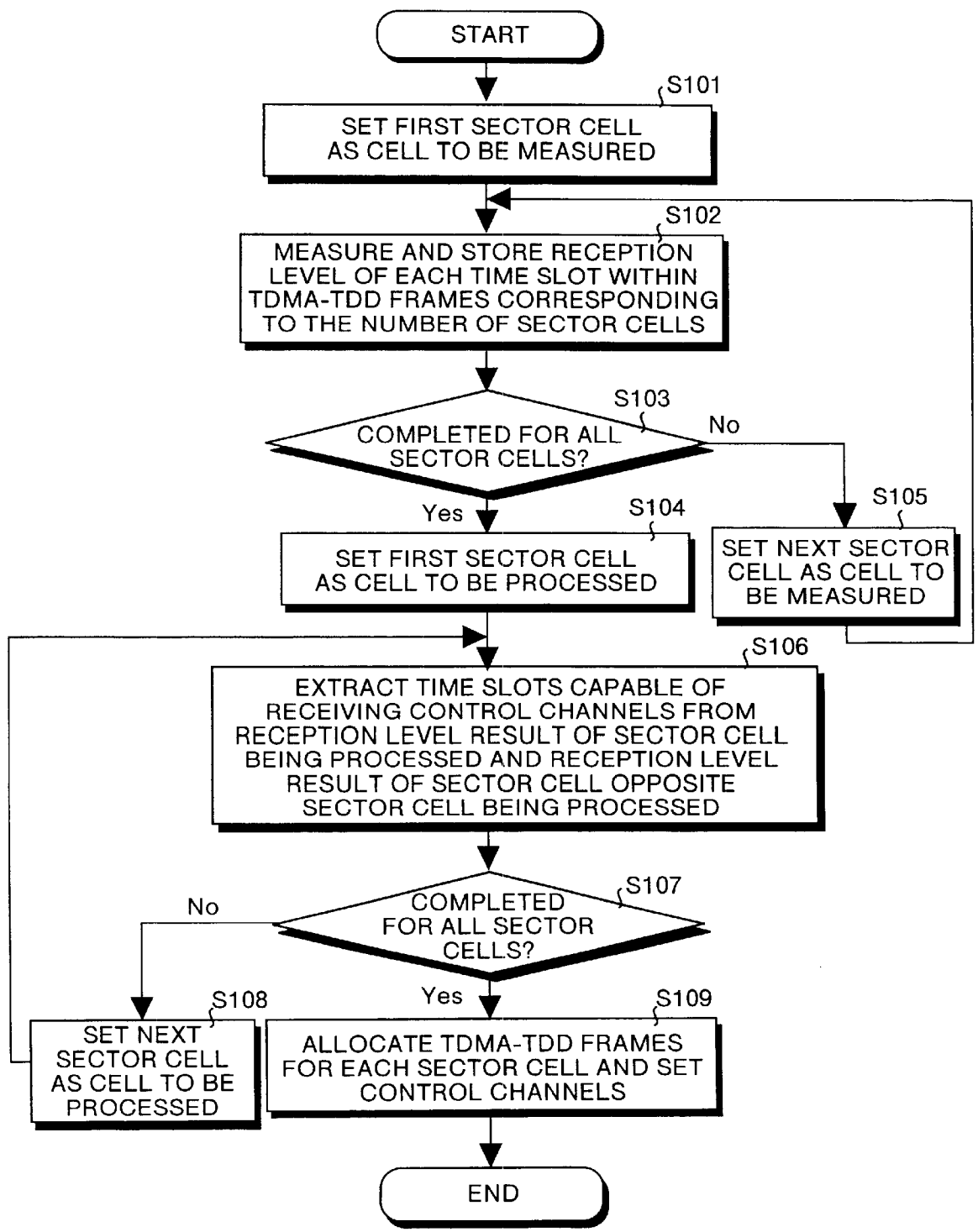
FIG. 2 is a flow chart showing the in the control channel placement method according to the first embodiment.

A detailed description will now be given of the embodiments of the control channel placement method according to the present invention while referring to the drawings. However, the present invention is not limited by these embodiments.

FIG. 1 shows the sector cell structure of a base station in which the control channel placement method according to the first embodiment is applied. A base station 10 is provided with directional antennas a1 to a6 having a directionality of 60° within each sector cell so as to divide a circular zone centered on the base station 10 into 6 fan-shaped sector cells C1 to C6 having same size. Here, it will be assumed that the same frequency has been allocated in each sector cell.

Moreover, the wireless access mode employed in the wireless communication system provided by the base station 10 is the above described TDMA-TDD mode. By combining the TDMA-TDD mode and the sector cell structure, it is possible to achieve highly efficient usage of a limited number of frequencies.

As is shown in FIG. 1, when a terminal station TA1 is located within the sector cell C1, the base station 10 is able to communicate with the terminal TA1 using the directional antenna a1. In addition, because the TDMA-TDD mode is employed, even if a plurality of terminal stations are located within the sector cell C1, simultaneous communication is possible in the number of time slots allowed in the TDMA-TDD frame.

The sequence of steps involved in the control channel placement method according to the first embodiment will now be explained. FIG. 2 is a flow chart showing these sequence of steps. In an initialization state in which communication for starting up and the like can be established (established in synchronization), the base station 10 selects one sector cell out of the sector cells C1 to C6. Let us assume that the sector cell C1 is set as the sector cell whose reception level is to be measured (step S101).

At this point, the reciprocal relationship between the respective sector cells and each sector cell in a position opposite the respective sector cells is determined. FIG. 3 shows the reciprocal relationship between each sector cell and it's opposite sector cell. As can be confirmed from FIG. 1, because each sector cell is allocated as one of six equilateral triangles forming a hexagon, the sector cells are placed opposite each other at symmetrical positions centered on the base station 10. Accordingly, as shown in FIG. 3, the sector cell C1 has an opposite relationship to the sector cell C4; the sector cell C2 has an opposite relationship to the sector cell C5; and the sector cell C3 has an opposite relationship to the sector cell C6.

Figure 4:
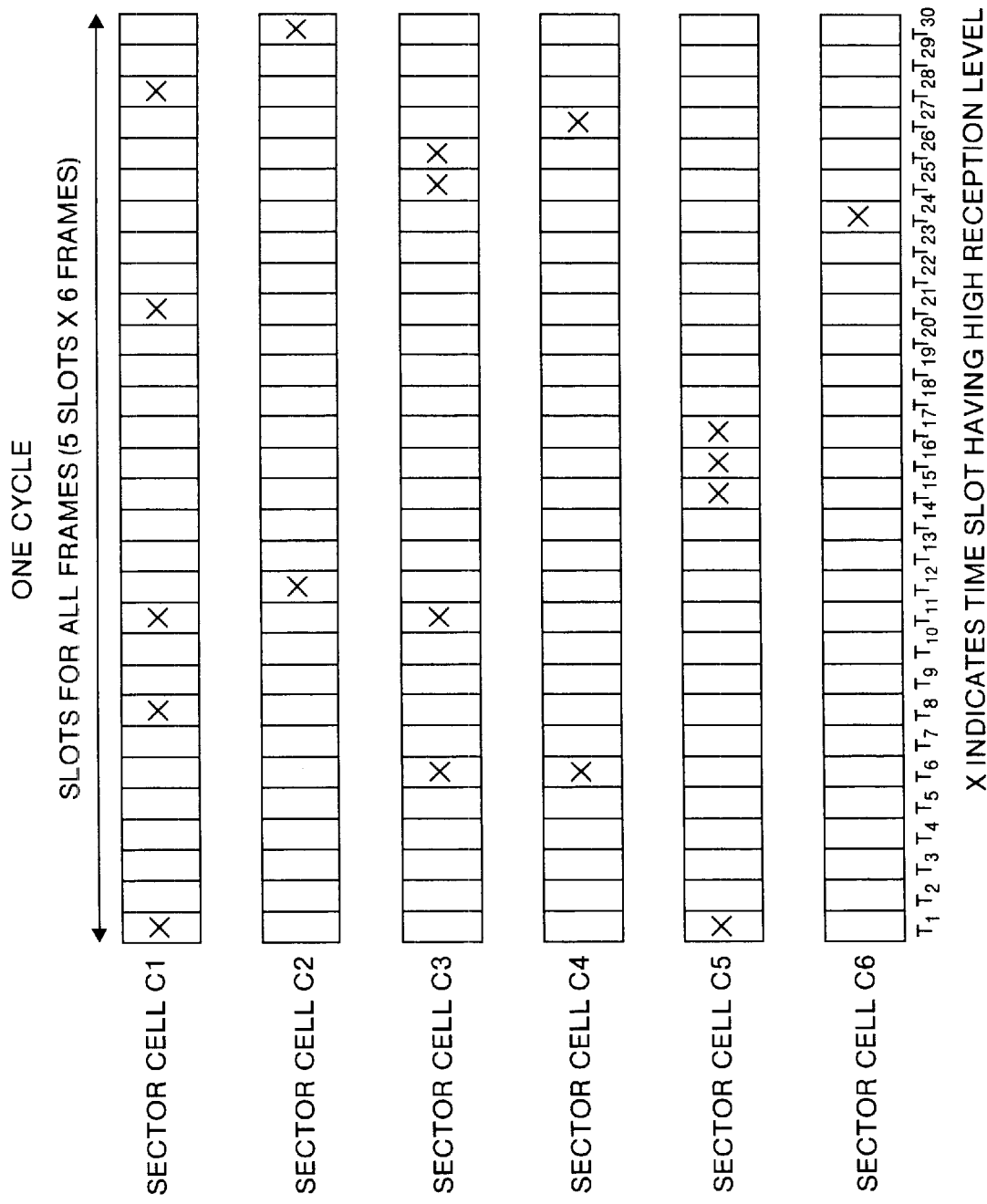
FIG. 4 is an explanatory diagram which shows an example of the structure of the TDMA-TDD frames in the control channel placement method according to the first embodiment.

After the processing of step S101, the reception levels in each time slot within the TDMA-TDD frames corresponding to the total number of sector cells are measured (step S102). FIG. 4 shows an example of the structure of the TDMA-TDD frames. The TDMA-TDD frames shown in FIG. 4 are formed from 5 time slots. In this case, in the processing in step S102, the number of time slots within the TDMA-TDD frames corresponding to the number of sector cells is 6 (the total number of sector cells) times 5 (time slots per TDMA-TDD frame), in other words 30.

In this way, the level of the wave band received in the sector cell C1 selected in step S101, namely, by the directional antenna a1 shown in FIG. 1, is measured for each of the 30 consecutive time slots, and the results of the measurement are stored. Variations in the reception level in each time slot are mainly caused by incoming interference waves from sector cells of other base stations provided peripheral to the base station 10.

Here, it is possible to calculate the carrier to interference ratio from the measurement of the reception levels. In this case, time slots in which the measured carrier to interference ratio is equal to or greater than a predetermined threshold value can be seen as being time slots that are receiving interference obstruction. As is shown in FIG. 4, these time slots are registered as not being suitable time slots (i.e. as time slots having a high level of reception) for receiving a control channel.

In FIG. 4, out of the time slots of 6 TDMA-TDD frames in the sector cell C1, the time slots $T_1$, $T_8$, $T_{11}$, $T_{21}$, and $T_{28}$ are each represented by an X mark. This means that these time slots are not suitable for receiving a control channel.

It is then determined whether or not the processing of step S102 has been performed for all sector cells (step S103). If the processing of step S102 has not been performed for all the sector cells, the next sector cell is selected as the sector cell to be measured (step S105). Since the sector cells are in the order C1, C2, C3, C4, C5, and C6 the sector cell C2 will be selected next.

If the processing of step S102 has been performed for all sector cells, namely, if measurement results such as those shown in FIG. 4 have been obtained for all sector cells, then the sector cell to be processed in the time slot extraction processing described below is set in the same way as in step S101 (step S104). Accordingly, the sector cell C1 is set as the sector cell to be processed.

Next, the result of the measurement of the reception level corresponding to the opposite sector cell as stipulated by the reciprocal relationship shown in FIG. 3 is added to the result of the measurement of the reception level corresponding to the sector cell set in step S104, and the time slot is registered again as being unsuitable for receiving a control channel.

Figure 5:
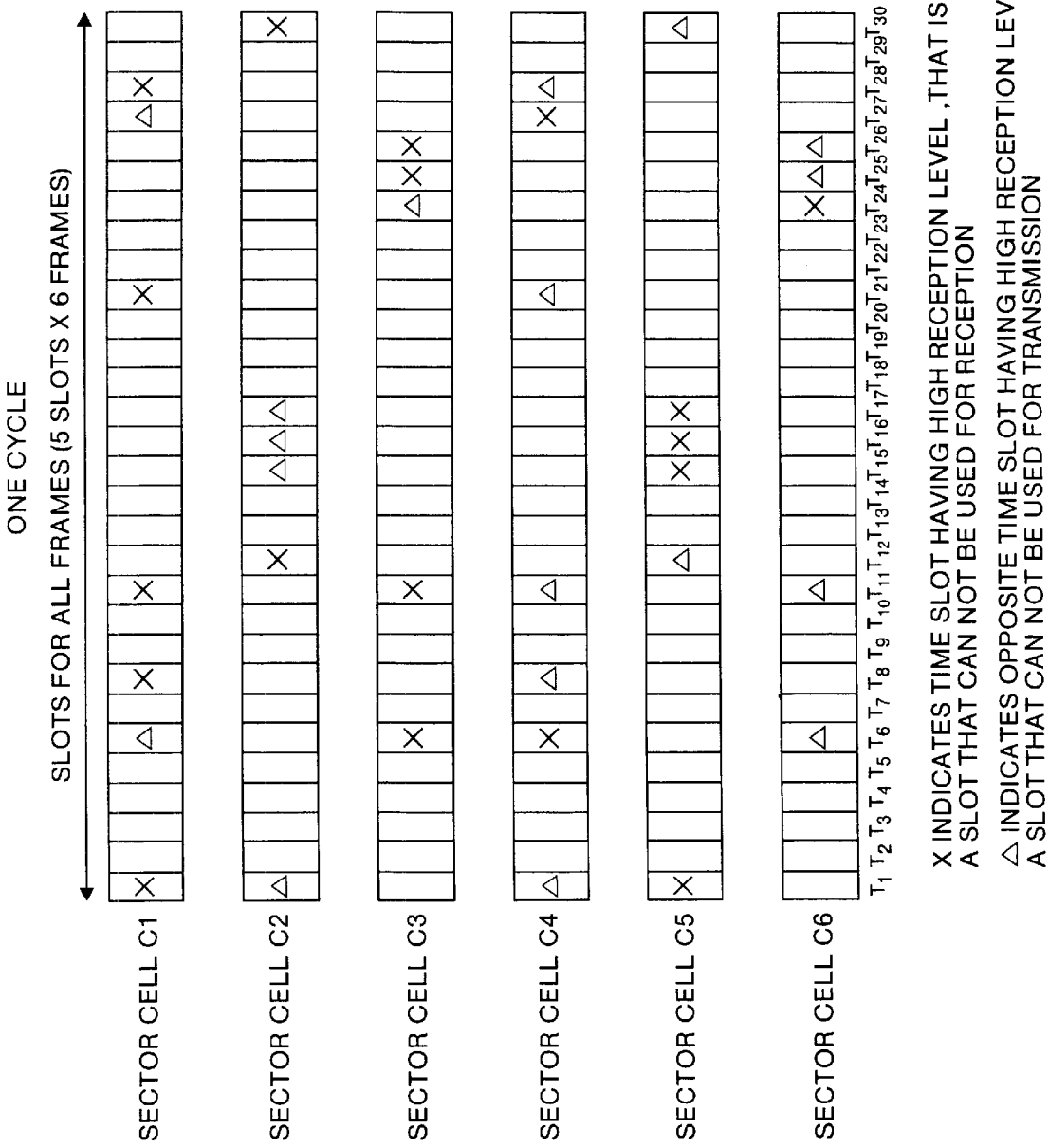
FIG. 5 is an explanatory diagram which shows the result when time slots each having a high reception level in both a specific sector cell and in the opposite sector cell are registered in each sector cell in the control channel placement method according to the first embodiment.

FIG. 5 shows the result when time slots each having a high reception level in both a specific sector cell and in the opposite sector cell are registered in each sector cell. In FIG. 5, as regards the results of the registration of the cell C1, for example, in addition to those positions in the time slots of the sector cell C1 itself that show a high reception level being registered as an X mark (see the sector cell C1 in FIG. 4), the positions $T_6$ and $T_{27}$ showing a high reception level in the time slots of the sector cell C4 itself that is positioned opposite the sector cell C1 are registered as a Δ mark.

The reason for adding the results of the measurement of the reception level of sector cells in opposite positions in the same base station, in this way, is explained below. As is shown in FIG. 1, for example, in a state in which an interfering station U4 is located in the direction of the sector cell C4 and a terminal station TA1 is located within the sector cell C1, if the base station 10 receives a signal from the interfering station U4 via the directional antenna a4, then if the base station 10 transmits a signal towards the terminal TA1 via the directional antenna a1, because the sector cells C1 and C4 are located opposite to each other, the directions in which the signals are transmitted end up approximately matching each other. The possibility thus exists that the terminal station TA1 will receive not only waves from the base station 10, but also from the interfering station U4.

Accordingly, in the time slot time series of the sector cell C1 shown in FIG. 5, those time slots registered with an X mark can be regarded as not suited for performing reception because the reception level in their host sector cell C1 is high. Moreover, time slots registered with a Δ mark can be regarded as not suited for performing transmission from the sector cell C1 because the reception level in the sector cell C4 located opposite the sector cell C1 is high.

In particular, those time slots indicated by the X mark and the Δ mark in FIG. 5 are not suitable for receiving an up control channel and a down control channel necessary for performing the establishment of synchronized communication, and are an obstacle to high quality communication.

Therefore, based on the registration contents shown in FIG. 5, the extraction of time slots from which those time slots having a high level of reception have been removed, namely, the extraction of time slots that are suitable for having control channels arranged therein, is performed in the host sector cell and in the sector located opposite the host sector cell (step S106).

Subsequently, it is determined whether or not the processing of step S106 has been performed for all the sector cells (step S107). If the processing of step S106 has not been performed for all the sector cells, the sector cell that should be selected next is set for processing (step S108). In this case, the sector cells are set in the same order as in the processing in step S105.

If the processing of step S106 has been performed for all the sector cells, namely, if registration results such as those shown in FIG. 5 have been obtained for all sector cells, then TDMA-TDD frames are allocated to the optimum time slots in each sector cell, based on these registration results (step S109).

Figure 6:
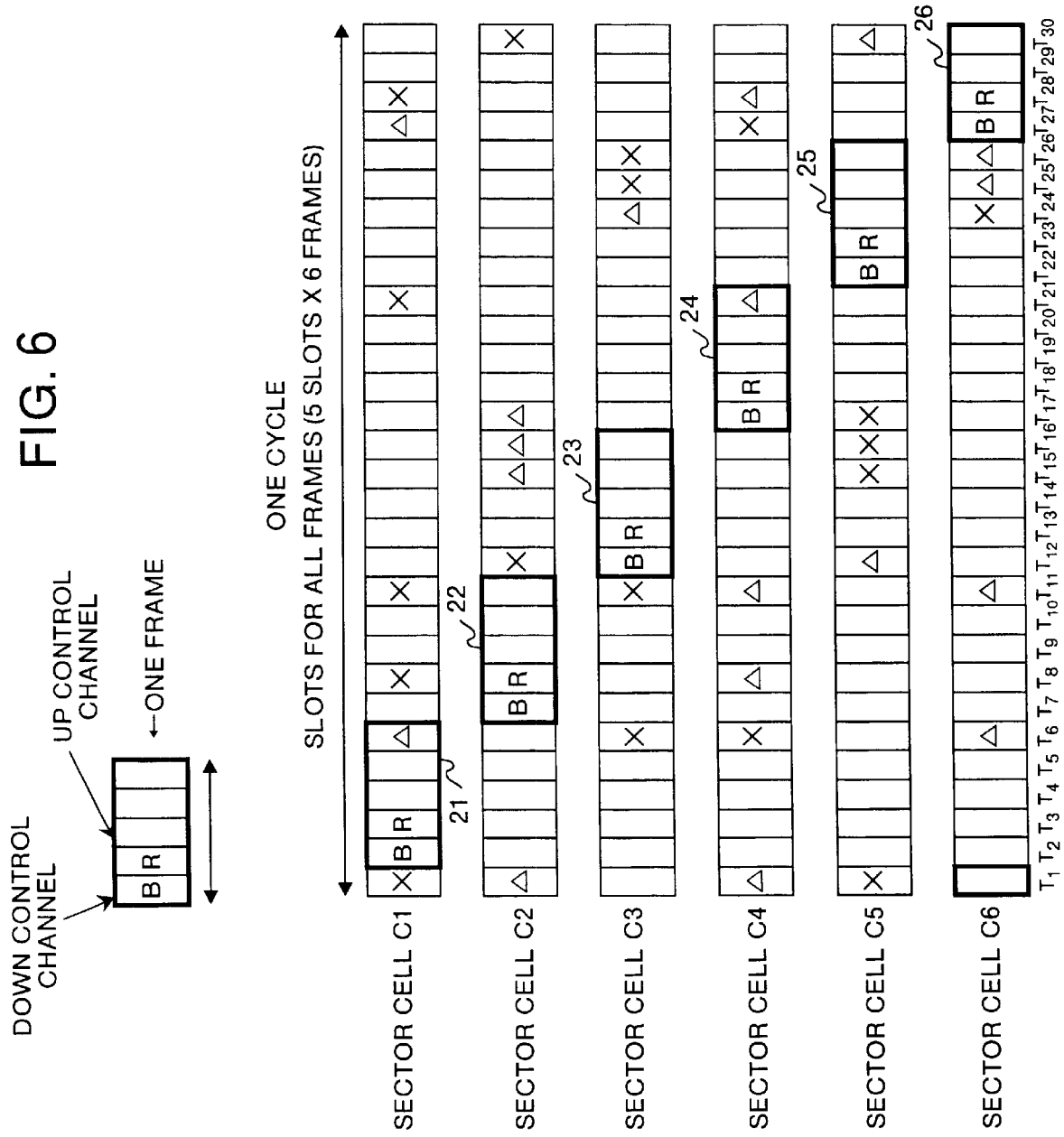
FIG. 6 is an explanatory diagram which explains the allocation of TDMA-TDD frames in the control channel placement method according to the first embodiment.

FIG. 6 explains in detail the allocation of TDMA-TDD frames performed in step S109. In the TDMA-TDD frame structure shown in FIG. 6, in one TDMA-TDD frame formed from 5 time slots, a down control channel B (broadcast) is placed in the first time slot, while an up control channel R (random) is placed in the second time slot. The remaining 3 time slots are used as communication channels so that, in this example, simultaneous communication with three terminal stations is possible.

Further, in the control channel method according to the present embodiment, by referring to those time slots in which control channels can be placed extracted in step S106 in FIG. 2, it is possible to perform the optimum TDMA-TDD frame allocation.

Specifically, the TDMA-TDD frames are allocated such that the down control channel B and the up control channel R shown in FIG. 6 are placed in positions where there is no X mark or Δ mark which indicate time slots incapable of placement of control channels. In this case, as a result of the TDMA-TDD frame allocation in the sector cell C1, it is necessary to select the optimum TDMA-TDD frame allocation positions such that the positions where the down control channels B and the up control channels R in the TDMA-TDD frames in each of the other sector cells C2 to C6 are placed do not overlap with either X marks or Δ marks.

Moreover, as described above, because the X marks shown in FIG. 5 and FIG. 6 can be regarded as time slots in which reception cannot be performed, it is preferable that the up control channels R be placed as far as possible from time slots with this X mark. In contrast, because the Δ marks can be regarded as time slots in which transmission cannot be performed, it is preferable that the down control channels B be placed as far as possible from time slots with this Δ mark.

In consideration of the above, in FIG. 6, the TDMA-TDD frame 21 in which the sector cell C1 control channel is transmitted is allocated from the time slot $T_2$, while the TDMA-TDD frame 22 in which the sector cell C2 control channel is transmitted is allocated from the time slot $T_7$. In the same way, for the sector cell C3 the TDMA-TDD frame 23 is allocated from the time slot $T_{12}$, for the sector cell c4 the TDMA-TDD frame 24 is allocated from the time slot $T_{17}$, for the sector cell c5 the TDMA-TDD frame 25 is allocated from the time slot $T_{22}$, and for the sector cell c6 the TDMA-TDD frame 26 is allocated from the time slot $T_{27}$, respectively.

Note that, in FIG. 6, in order to simplify the description, only the time slots $T_1$ to $T_{30}$ of the control channel transmission cycle, namely, of the 6 TDMA-TDD frames are shown, and, in particular, for the sector cell C6, the last time slot in the TDMA-TDD frame 26, that is the time slot $T_1$ looks separated from the other time slots. However, in reality, the last time slot is in continuation with the time slot $T_{30}$ because it is a time series. Therefore, in the present description, the symbols $T_1$ to $T_{30}$ are simply used to specify illustrated time slots for description. Moreover, in each figure, only those TDMA-TDD frames in which control channels are arranged are shown with a bold outline. However, in reality, TDMA-TDD frames of the same size are connected to these. The same applies to the description given below.

In the above description, both the down control channel B and the up control channel R were placed within the same TDMA-TDD frame. However, the present invention can also be applied even when the down control channel B and the up control channel R are placed within different TDMA-TDD frames.

Figure 7:
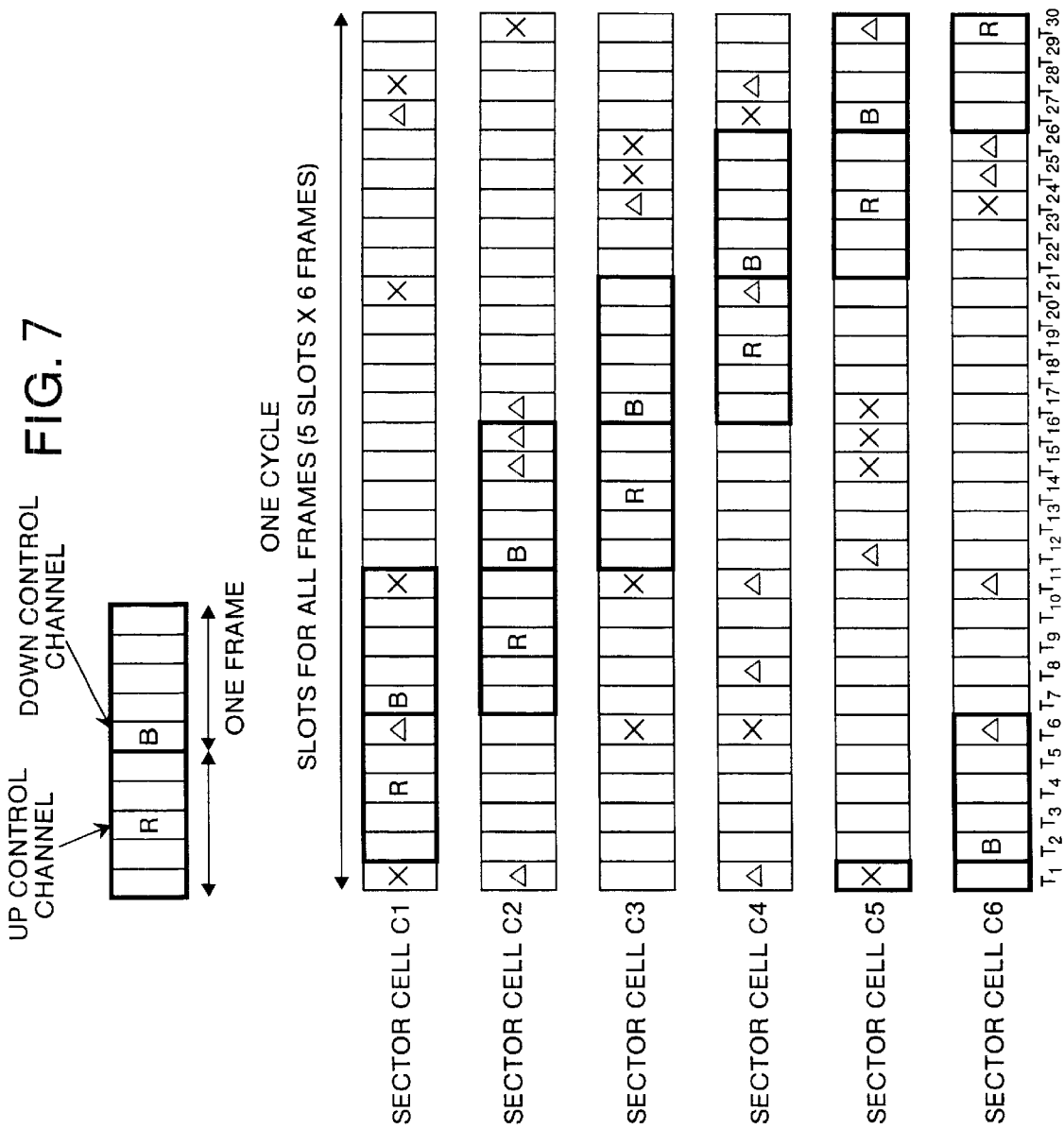
FIG. 7 is an explanatory diagram which shows an example of a different allocation of TDMA-TDD frames in the control channel placement method according to the first embodiment.

FIG. 7 shows the TDMA-TDD frame allocation when the down control channel B and the up control channel R are placed within different TDMA-TDD frames. As shows in FIG. 7, the up control channel R is placed in the first TDMA-TDD frame while the down control channel B is placed in the second TDMA-TDD frame from among the six TDMA-TDD frames of the control channel transmission cycle.

In particular, the up control channel R is placed in the third time slot of the of a TDMA-TDD frame, while the down control channel B is placed in the first time slot of a TDMA-TDD frame. In addition, in the same way as in the above described frame allocation processing, frame allocation for the two TDMA-TDD frames in which the control channels have thus been placed is also performed such that the up control channel R and the down control channel B are placed in locations other than those having the X mark or the Δ mark indicating time slots in which control channels cannot be placed.

The TDMA-TDD frame in which the up control channel R of the sector cell C1 is transmitted is allocated from the time slot $T_2$, while the TDMA-TDD frame in which the down control channel B of the sector cell C1 is transmitted is allocated from the time slot $T_7$. Moreover, the TDMA-TDD frame in which the up control channel R of the sector cell C2 is transmitted is allocated from the time slot $T_7$ within the TDMA-TDD frame that has been shifted along by one frame from the TDMA-TDD frame in which the up control channel R of the sector cell C1 was transmitted. Subsequently, the TDMA-TDD frame in which the down control channel B of the sector cell C2 is transmitted is allocated. Thereafter, the TDMA-TDD frames are allocated in the same way for the sector cells C2 to C6.

As described above, according to the control channel placement method of the first embodiment, when transmission is performed by a base station having a plurality of sector cells with both up control channels and down control channels placed in predetermined time slot positions within TDMA-TDD frames for each sector cell, the reception level of each time slot is measured for each sector cell across TDMA-TDD frames corresponding to the number of sector cells of the base station. Consequently, using the result of the measurement of the reception level measured in the first sector cell and the result of the measurement of the reception level measured for the second sector cell at a position opposite to the first sector cell from among all the sector cells within the same base station, time slots in which control channels can be placed are extracted from among the time slots extending for the TDMA-TDD frames corresponding to the number of sector cells. Subsequently, the TDMA-TDD frames are allocated for each sector cell such that the positions of the above extracted time slots and the predetermined time slot positions in which control channels are placed (in the above described example, the first and second time slots within a TDMA-TDD frame) out of the time slots within the TDMA-TDD frames coincide with each other. Because of such arrangement, the up control channel and the down control channel can be placed simultaneously in optimum time slot positions. As a result, it is possible, in a wireless communication system, to establish high quality and stable wireless channel communication.

In the above-explained first embodiment, the reception level of each time slot within the TDMA-TDD frames corresponding to the entire number of sector cells was measured and stored, and time slots whose reception level was over a predetermined threshold value out of the measured reception levels were considered to be unsuitable for the placement of control channels. However, after the reception level of each time slot within the TDMA-TDD frames corresponding to the entire number of sector cells has been measured and stored, it is also possible to acquire the reception level distribution from the reception level results from each sector cell and the reception level results from the sector cell opposite each sector cell, and to specify time slots suitable for the placement of control channels for each sector cell from the overall reception level distribution.

When such a method is employed, it is possible, for example, to allocate TDMA-TDD frames such that control channels are placed in sequence beginning with the time slot having the lowest reception level (or carrier to interference ratio calculated from the reception levels) from among the acquired reception level distribution. When this TDMA-TDD frame allocation is performed as well, as described above, because the allocation of TDMA-TDD frames for the other sector cells is automatically determined by the allocation of TDMA-TDD frames for one sector cell, it is necessary to find and fix the position where the total reception level of the time slots in which each control channel is going to be placed in all the sector cells will be the lowest.

Next, the control channel placement method according to the second embodiment will be described. In the control channel placement method according to the second embodiment, the placement of control channels is carried out using the above control channel placement method according to the first embodiment. When wireless communication has been established, the reception level of the control channels is measured. The difference is that, based on the results of the measurement, the control channels are placed once again by performing again the above time slot extraction process and TDMA-TDD frame allocation process.

Because the sector cell structure of the base station and the wireless access mode are the same as in the first embodiment, a description thereof is omitted here. The processing after the establishment of wireless communication by the placement of control channels using the control channel placement method according to the first embodiment will only be described here.

Figure 8:
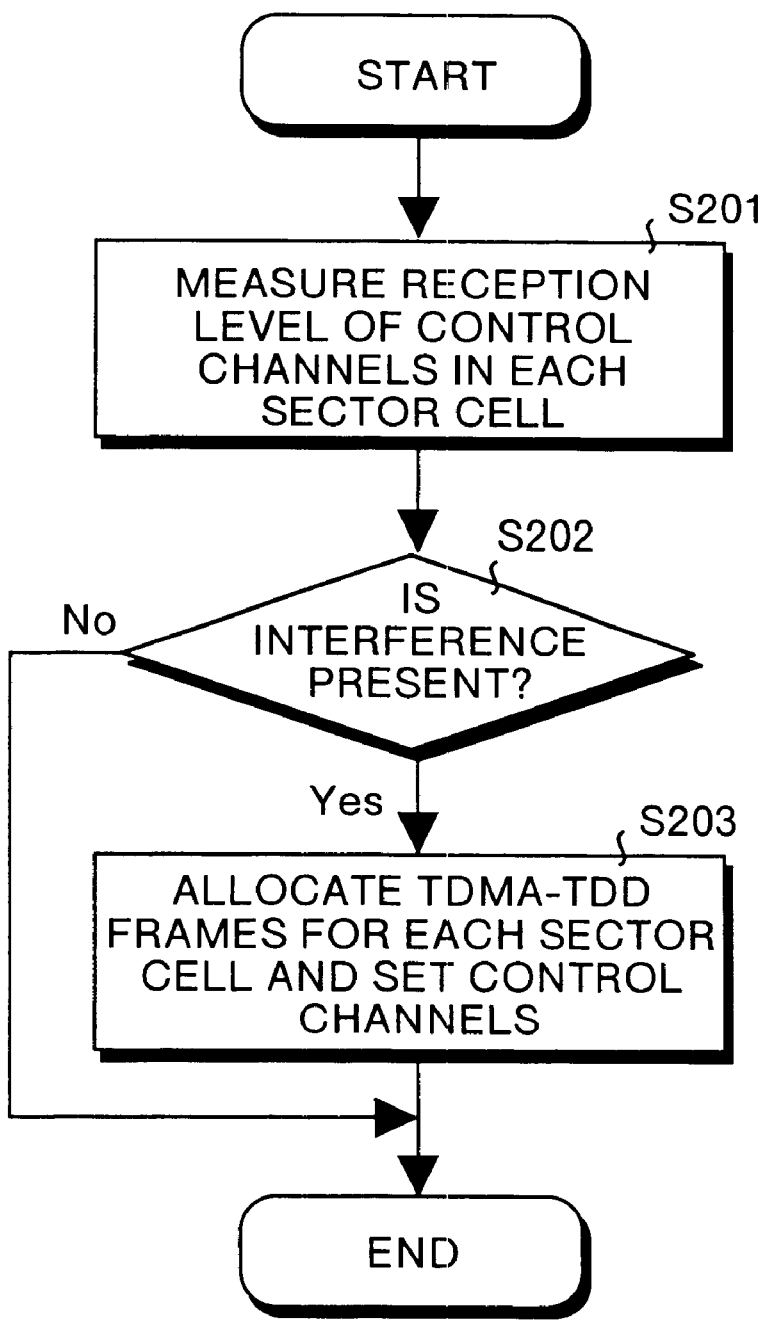
FIG. 8 is a flow chart showing the sequence of steps in the control channel placement method according to the second embodiment.

FIG. 8 shows the sequence of steps in the control channel placement method according to the second embodiment. The base station 10 measures the reception levels in the time slots of control channels placed so as to avoid those time slots (having the X mark or the Δ mark) in which control channels could be placed in step S106 of FIG. 2 in each sector cell (step S201).

Figure 9:
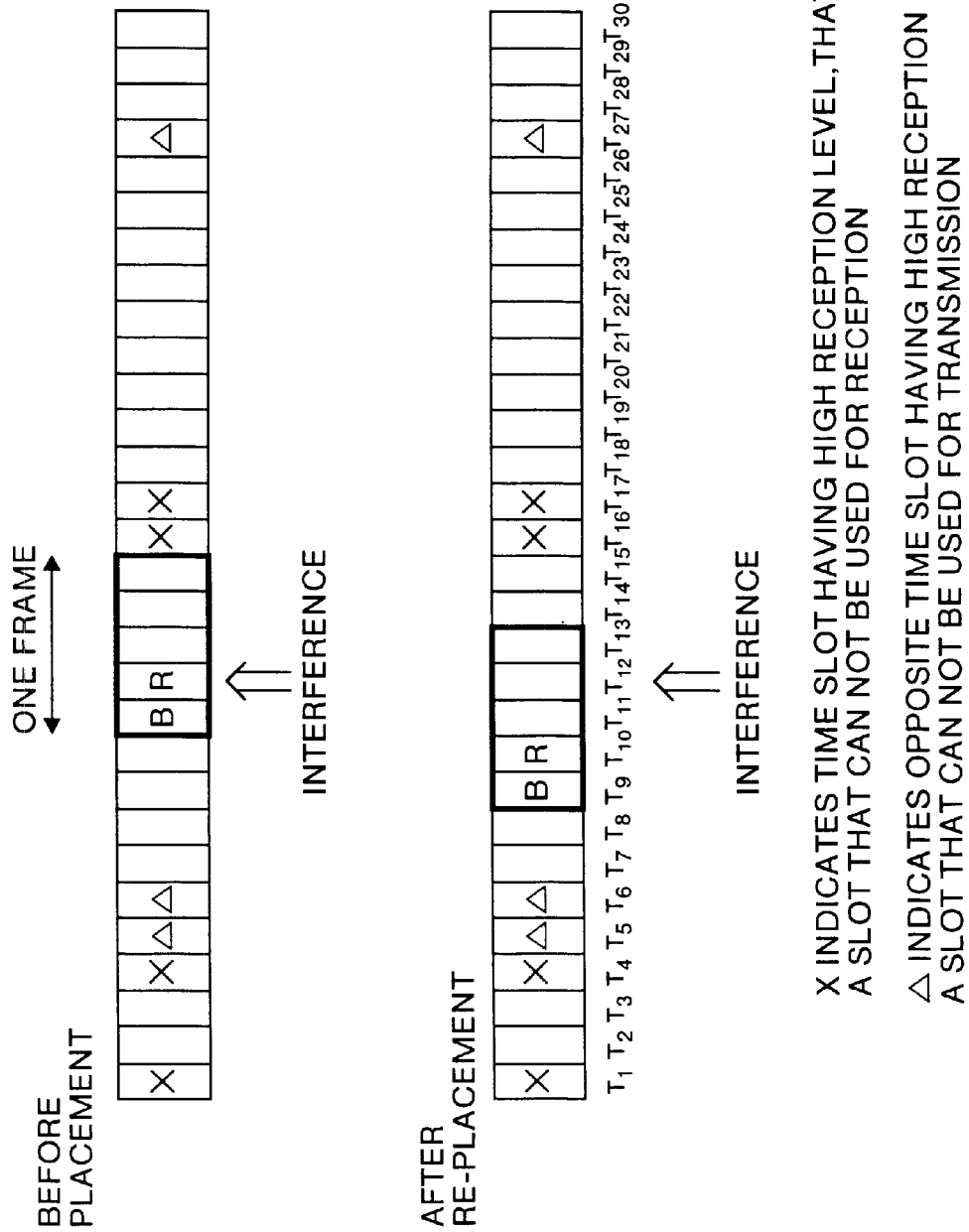
FIG. 9 is an explanatory view which shows an example of the structure of the TDMA-TDD frames in the control channel placement method according to the second embodiment.

FIG. 9 shows an example of the structure of the TDMA-TDD frames. In the same way as in the first embodiment, the TDMA-TDD frames shown in FIG. 9 are formed from five time slots with six TDMA-TDD frames set as one cycle. Transmission and reception are performed with the down control channel B and the up control channel R placed in the first and second time slots respectively within the leading TDMA-TDD frame.

In FIG. 9, before the control channel placement method according to the present embodiment is employed, namely, in a state before the TDMA-TDD frames are reallocated, the TDMA-TDD frame in which the above control channels have been placed is allocated from the time slot $T_{11}$. In this state, the processing of step S201 is performed.

Next, based on the reception levels measured in the processing of step S201, it is determined whether or not the time slot measured was receiving interference obstruction (step S202). Note that, in the processing of step S201, it is possible to calculate the carrier to interference ratio from the measurement of the reception levels and, in this case, in the determination of step S202, the time slots of the control channels are regarded as receiving interference obstruction when the measured carrier to interference ratio is above a predetermined threshold value.

At this time, the control channels are temporarily freed from the control channel time slots and, in a state in which the establishment of communication is shut, namely, in a blocked state, it is possible to perform the above carrier to interference ratio measurement. As a result, it is possible to accurately determine whether or not the sole cause of variations in the reception level is the interference.

Moreover, in the measurement of the carrier to interference ratio, there is a possibility of collisions occurring because the up control channel is a random access type of channel. In this case, it is unclear whether the variations in the reception level in particular are due to collision or due to interference obstruction. Therefore, when a state in which the carrier to interference ratio is equal to or greater than the predetermined threshold for a predetermined length of time, it is also possible to determine that this is due to interference obstruction.

Apart from using the carrier to interference ratio, it is also possible to calculate the error detection rate in the communication channel and up control channel received by the base station 10 from a terminal station, and to determine from the result thereof whether or not the control channel time slot is receiving interference obstruction.

When it is not determined in step S202 that interference obstruction is being received, this processing is ended and the processing of step S201 is performed again after the lapse of a predetermined length of time. If, however, it is determined in step S202 that interference obstruction is being received, in the same way as in the processing of step S109 of FIG. 2, the allocation of the TDMA-TDD frames is performed once again while avoiding time slots in which control channels cannot be placed, and the up control channel and the down control channel are set (step S203). Namely, the reallocation of the TDMA-TDD frames is achieved by the processing of step S203.

In FIG. 9, if it is determined by the processing of the above step S202 that the time slot $T_{12}$ of the up control channel R is receiving interference obstruction, the reallocation of the TDMA-TDD frames is performed such that the TDMA-TDD frame in which the control channels have been placed is allocated from the time slot $T_9$.

Note that, in this reallocation of the TDMA-TDD frames, the allocation position is decided using time slots newly receiving interference obstruction (the time slot $T_{12}$ in the above example) and the result of the time slot extraction of the processing of step S106 of FIG. 2.

Moreover, in addition to the registering of the time slots newly receiving interference obstruction as time slots having a high reception level, in the same way as in the processing of step S106 of FIG. 2, measurement of the reception level is performed once again for each time slot extending over the TDMA-TDD frames of the entire number of sector cells (including the time slots of the sector cells positioned opposite). After those time slots in which control channel placement is possible have then been extracted, the allocation positions of the TDMA-TDD frames may then be decided using the extraction results.

In the above description of the second embodiment, the TDMA-TDD frame reallocation positions were decided such that the control channel placement positions coincided with time slots in which control channel can be placed, by referring to all of the time slots extending over the TDMA-TDD frames corresponding to the number of sector cells, however, if it is determined that the control channels are receiving interference obstruction, it is also possible to try and reestablish communication by shifting the TDMA-TDD frames in which control channels are placed by one time slot either forwards or backwards.

In this case, after a predetermined time has lapsed, the reception level is measured again in the same way as in step S201 of FIG. 8 and, in accordance with the result of the measurement, this movement of the TDMA-TDD frame placement by one time slot is repeated until finally the control channels are placed in time slots not receiving interference.

Figure 10:
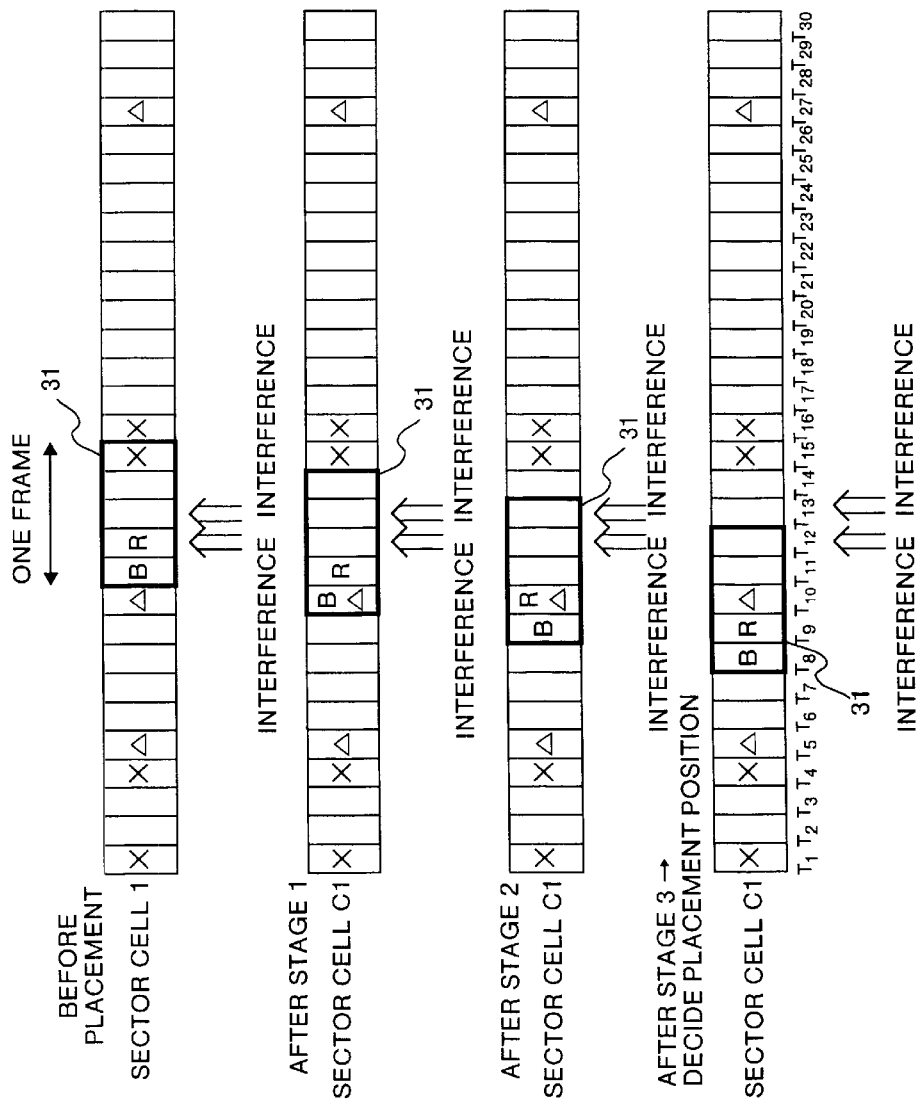
FIG. 10 is an explanatory diagram which explains an example of the allocation of TDMA-TDD frames in the control channel placement method according to the second embodiment.

FIG. 10 is an explanatory diagram for describing an example of the TDMA-TDD frame allocation in this case. In FIG. 10, looking at the sector cell C1, before the control channel placement method of the present embodiment is implemented, namely, in a state before the TDMA-TDD frame reallocation, a state is shown in which the time slot $T_{12}$ of the up control channel R and the time slot $T_{13}$ of the communication channel within the TDMA-TDD frame 31 allocated from the time slot $T_{11}$ are receiving interference.

In this case, using the same processing as in the above is steps S201 and S202, when it is determined that the time slot $T_{12}$ of the up control channel R is receiving interference, reallocation is performed by shifting the TDMA-TDD frame 31 by one time slot in the forward direction (after stage 1).

Due to this reallocation after stage 1, the down control channel B of the TDMA-TDD frame 31 is placed in the time slot $T_{10}$, however, because this time slot $T_{10}$ in the opposite sector cell C4 was registered as a high reception level time slot in step S106 (indicated in the figure by the mark Δ), it becomes necessary to reallocate the TDMA-TDD frame 31 by measuring the reception levels once again, in the same way as in step S201 in FIG. 8, after the lapse of a predetermined time.

Therefore, the TDMA-TDD frame 31 is shifted by one time slot again in the forward direction and reallocated (after stage 2). As a result, the down control channel B within the TDMA-TDD frame 31 is placed in the time slot $T_9$ so as to escape from the interference in the time slot $T_{10}$, however, the up control channel R then receives the interference in the time slot $T_{10}$. Accordingly, in this state as well, it again becomes necessary to reallocate the TDMA-TDD frame 31 by measuring the reception levels once again, in the same way as in step S201 in FIG. 8, after the lapse of a predetermined time (after stage 3).

Because both the down control channel B and the up control channel R are free from interference as a result of the reallocation after stage 3, it is possible to perform high quality communication in this final control channel placement position. Note that, at this time, because the TDMA-TDD frame allocation is also altered for the other sector cells, it is actually necessary to decide the final placement position using the state of the reception levels of control channels for all the sector cells after the reallocation.

It is also possible to perform reallocation by shifting the TDMA-TDD frame 31 by one time slot towards the rear, however, in the above example, because the time slot $T_{12}$ of the up control channel R and the time slot behind that $T_{13}$ are receiving interference in the state before reallocation, it would be necessary to repeat the reallocation by the number of stages that take this into account.

In this way, by attempting to establish communication each time by shifting the reallocation of the TDMA-TDD frames by one time slot forwards or backwards, it is possible to omit the calculation to search for time slots capable of receiving control channels. Furthermore, it is possible to keep the time when communication cannot be established to the minimum, thereby enabling communication to be rapidly restored.

As explained above, in the control channel placement method according to the second embodiment, when transmission is performed by a base station having a plurality of sector cells with both up control channels and down control channels placed in predetermined time slot positions within TDMA-TDD frames for each sector cell, the reception level of each time slot is measured for each sector cell across TDMA-TDD frames corresponding to the number of sector cells of the base station. Consequently, using the result of the measurement of the reception level measured in the first sector cell and the result of the measurement of the reception level measured for the second sector cell at a position opposite to the first sector cell from among all the sector cells within the same base station, time slots in which control channels can be placed are extracted from among the time slots that extending across the same number of TDMA-TDD frames as there are sector cells. Subsequently, in a state in which as a result of the TDMA-TDD frames being allocated for each sector cell such that the positions of the above extracted time slots and predetermined time slot positions in which control channels are placed, from among the time slots within the TDMA-TDD frames, coincide with each other, the reception levels of time slots in which the control channels are placed are measured for each sector cell each time a predetermined length of time has elapsed. When the result of the measurement of the reception level is equal to or greater than a predetermined threshold, the TDMA-TDD frame allocation is performed once again. Therefore, it is possible to avoid deterioration in the quality of communication caused by interference obstruction generated while communication is established, and it is possible, in a wireless communication system, to establish high quality and stable wireless channel communication.

Next, the control channel placement method according to the third embodiment will be described. The control channel placement method according to the third embodiment is characterized in that, in contrast to the respective placement one by one of the up control channel R and the down control channel B within the TDMA-TDD frames of the control channel placement method according to the first embodiment, a plurality of up control channels R and down control channels B are each placed within the same TDMA-TDD frame and each sector cell uses one of this plurality of control channels as the control channel.

The sector cell structure and the wireless access method of the base station are the same as in the first embodiment. Therefore, an explanation of these is omitted here. Moreover, the processing using the control channel placement method according to the third embodiment is the same as that shown in FIG. 2, except for the processing at step S109. Therefore, the TDMA-TDD frame allocation processing that corresponds to the processing at step S109 will only be explained here.

Figure 11:
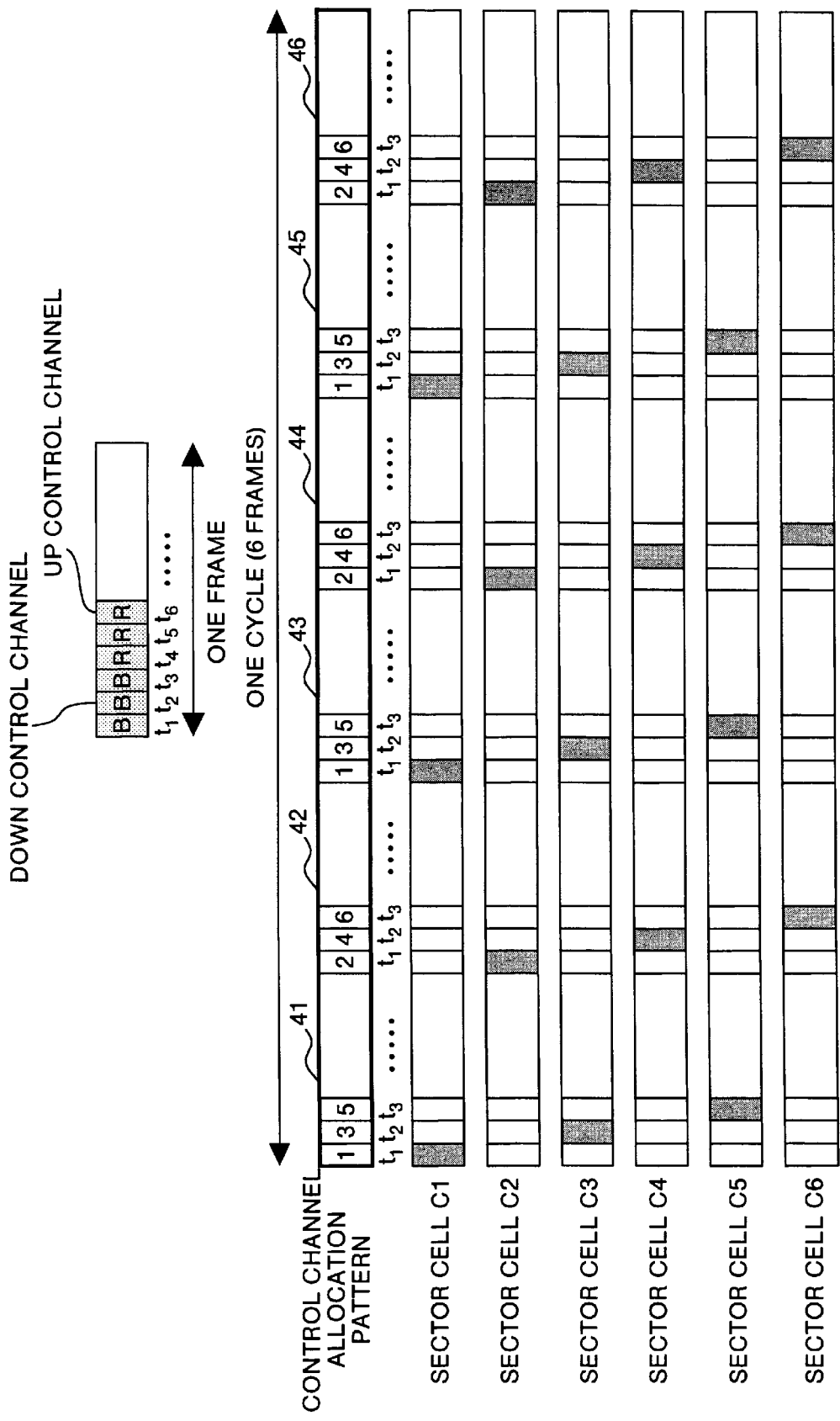
FIG. 11 is an explanatory diagram which shows an example of the structure of the TDMA-TDD frames in the control channel placement method according to the third embodiment.

FIG. 11 shows the TDMA-TDD frame allocation in the control channel placement method according to the third embodiment. In the control channel placement method according to the third embodiment, down control channels B are placed in the first to third time slots $t_1$ to $t_3$, while up control channels R are placed in the fourth to sixth time slots $t_4$ to $t_6$ within a single TDMA-TDD frame formed from a plurality of time slots. The remaining time slots are used as communication channels.

Moreover, with the frame structure formed such that the TDMA-TDD frames corresponding to the total number of sector cells, namely, the six TDMA-TDD frames from 41 to 46 are set as one cycle, in each sector cell, one of the plurality of time slots in which the same type of control channel can be placed within the TDMA-TDD frame is allocated in advance as the control channel placement position.

In the example shown in FIG. 11, in the sector cell C1, the first time slot $t_1$ in the first TDMA-TDD frame 41, the third TDMA-TDD frame 43, and the fifth TDMA-TDD frame 45 is provided as the down control channel B. In the sector cell C2, the first time slot $t_1$ in the second TDMA-TDD frame 42, the fourth TDMA-TDD frame 44, and the sixth TDMA-TDD frame 46 is provided as the down control channel B.

In the sector cell C3, the second time slot $t_2$ in the first TDMA-TDD frame 41, the third TDMA-TDD frame 43, and the fifth TDMA-TDD frame 45 is provided as the down control channel B. In the sector cell C4, the second time slot $t_2$ in the second TDMA-TDD frame 42, the fourth TDMA-TDD frame 44, and the sixth TDMA-TDD frame 46 is provided as the down control channel B.

Further, in the sector cell C5, the third time slot $t_3$ in the first TDMA-TDD frame 41, the third TDMA-TDD frame 43, and the fifth TDMA-TDD frame 45 is provided as the down control channel B. In the sector cell C6, the third time slot $t_3$ in each of the second TDMA-TDD frame 42, the fourth TDMA-TDD frame 44, and the sixth TDMA-TDD frame 46 is provided as the down control channel B.

Thus, in each sector cell, hatched time slots can be used as the down control channel B. Note that, in the same way as the down control channel B, for the up control channel R, in each sector cell, one of the time slots $t_4$ to $t_6$ within each TDMA-TDD frame can be used as the down control channel B.

Accordingly, in each sector cell, it is possible to select for use any one of the same type of control channels provided in three TDMA-TDD frames from among the six TDMA-TDD frames corresponding to one cycle.

The specific TDMA-TDD frame allocation method in this case is described below. Firstly, as is shown in FIG. 11, control channel placement positions allocated in each sector cell are determined in advance in each of the six TDMA-TDD frames corresponding to one cycle. Next, as explained in the first embodiment, the reception level of each time slot within the six TDMA-TDD frames is measured, and the reception level registration result is acquired, as was shown in FIG. 5. Next, the placement of the TDMA-TDD frames is decided such that the determined control channel placement positions do not coincide with the positions of time slots registered with the X marks or the Δ marks in the acquired registration result.

Note that, after the above TDMA-TDD frame allocation has been completed, in a state in which wireless communication has been established, the reception level in the control channels actually placed in each of the sector cells is regularly measured. If the result of the measurement exceeds a predetermined reception level, then the TDMA-TDD frame allocation processing may be performed once again.

In this case, as was described above, because it is possible to select and use any one of the same type of control channels placed in three TDMA-TDD frames from among the six TDMA-TDD frames in each sector cell, if there are any time slots in which the predetermined reception level has not exceeded from among those remaining time slots that can be selected as the same type of control channel, those time slots can be set and used as control channels. Accordingly, in this case, there is no need to implement the TDMA-TDD frame allocation processing.

In contrast, if all of the remaining time slots that can be selected as the same type of control channel exceed the predetermined reception level, it is necessary to again implement the TDMA-TDD frame allocation processing. This new TDMA-TDD frame allocation processing, namely, the TDMA-TDD frame reallocation processing can be achieved, for example, by repeatedly shifting all of the TDMA-TDD frames in which control channels are currently placed either forwards or backwards by one time slot, and then attempting to reestablish communication.

Figure 12:
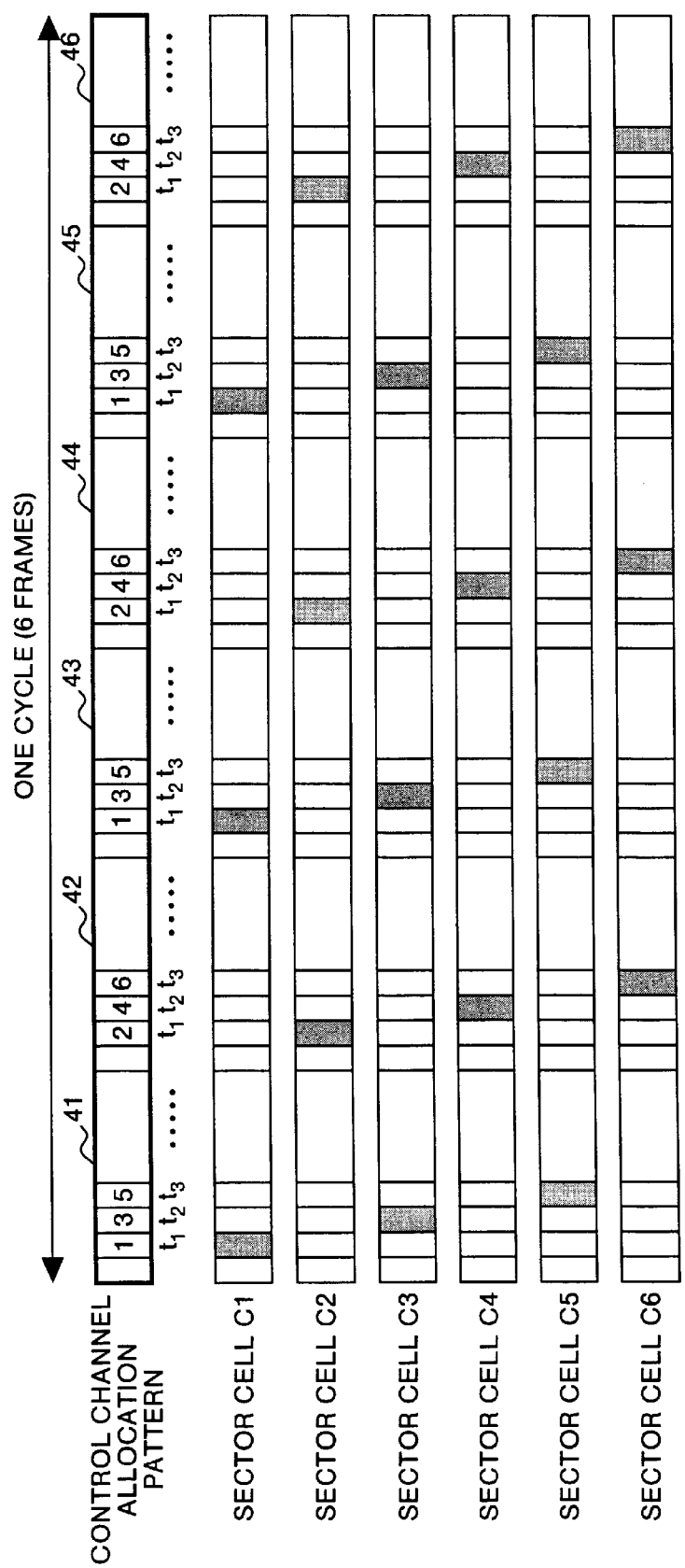
FIG. 12 is an explanatory diagram which shows an example of the allocation of TDMA-TDD frames in the control channel placement method according to the third embodiment.

FIG. 12 shows the TDMA-TDD frame reallocation in this case. Particularly, FIG. 12 shows a case in which reallocation is performed with the entire TDMA-TDD frames shifted backwards by one time slot. The reception levels of the control channels actually placed in each sector cell are measured again, and a determination is made as to whether or not the result of the measurement exceeds the predetermined reception level. As a result of this, a decision is made as to whether to shift the TDMA-TDD frames by a further time slot and again perform the allocation, or whether to set this as the control channel placement position.

As explained above, in the control channel placement method according to the third embodiment, a plurality of time slots in which the same type of control channel can be placed are prepared within a single TDMA-TDD frame, and different sector cells use the above control channels within the same TDMA-TDD frame. Moreover, time slots capable of receiving control channels that can be used by the same sector cell are fixed in advance across a plurality of TDMA-TDD frames from among the TDMA-TDD frames corresponding to the total number of sector cells corresponding to one cycle. Therefore, in the TDMA-TDD frame allocation processing or in the TDMA-TDD frame reallocation processing, even if one control channel becomes temporarily unusable (when viewed from the terminal station side) due to interference, other control channels that are capable of reception can be selected and used, thereby enabling high quality, stable communication to be provided in a wireless communication system.

Next, the control channel placement method according to the fourth embodiment will be described. The control channel placement method according to the fourth embodiment is characterized in that, in contrast to the securing of a plurality of time slots capable of receiving control channels of the same type and the determining in advance of the placement positions of time slots able to be used as control channels by the same sector cell of the control channel placement method according to the third embodiment, the placement positions of those time slots able to be used as control channels is decided in accordance with the result of the measurement of the reception level of each time slot.

The wireless access mode and the sector cell structure of the base station are the same as those of the first embodiment and a description thereof is omitted here. Only the TDMA-TDD frame allocation processing corresponding to the processing in step S109 shown in FIG. 2 will be explained here.

Figure 13:
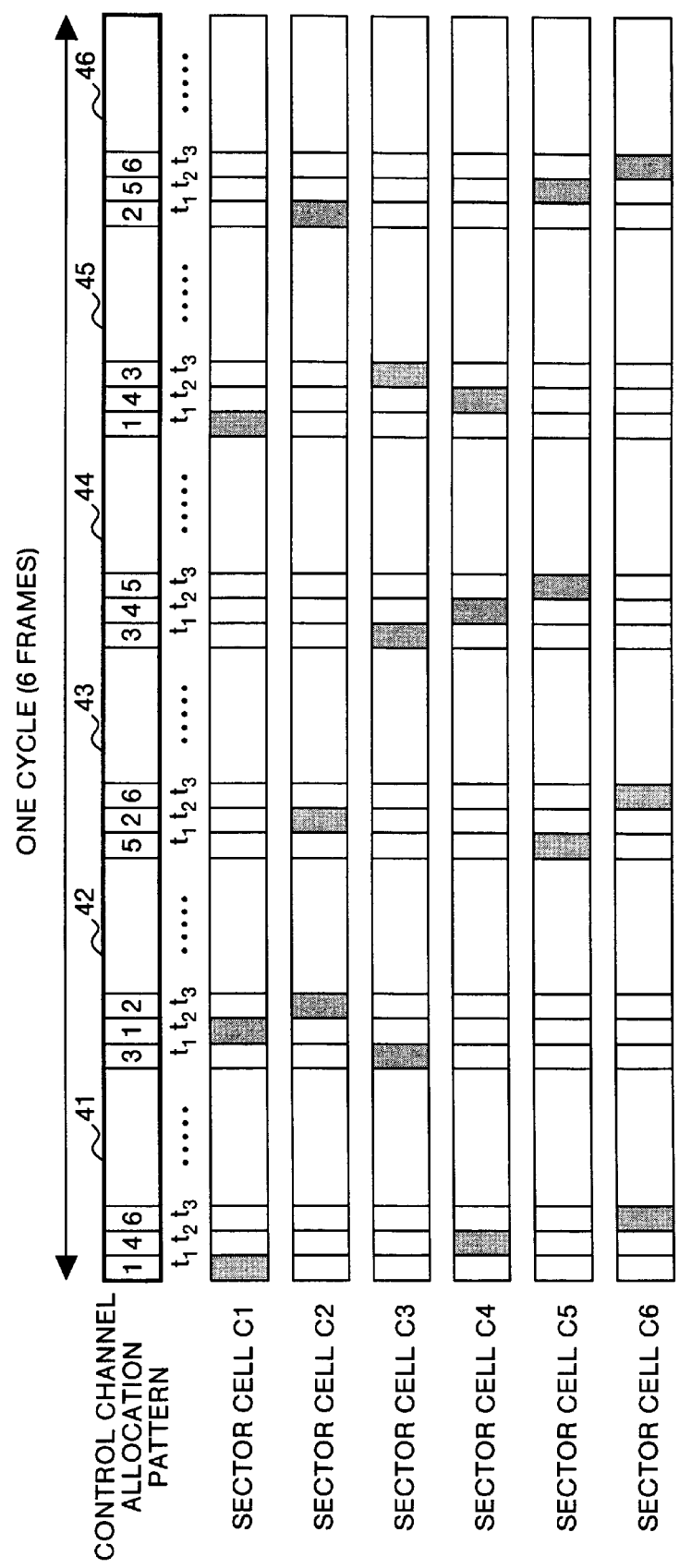
FIG. 13 is an explanatory diagram which shows an example of the allocation of TDMA-TDD frames in the control channel placement method according to the fourth embodiment.
Figure 14:
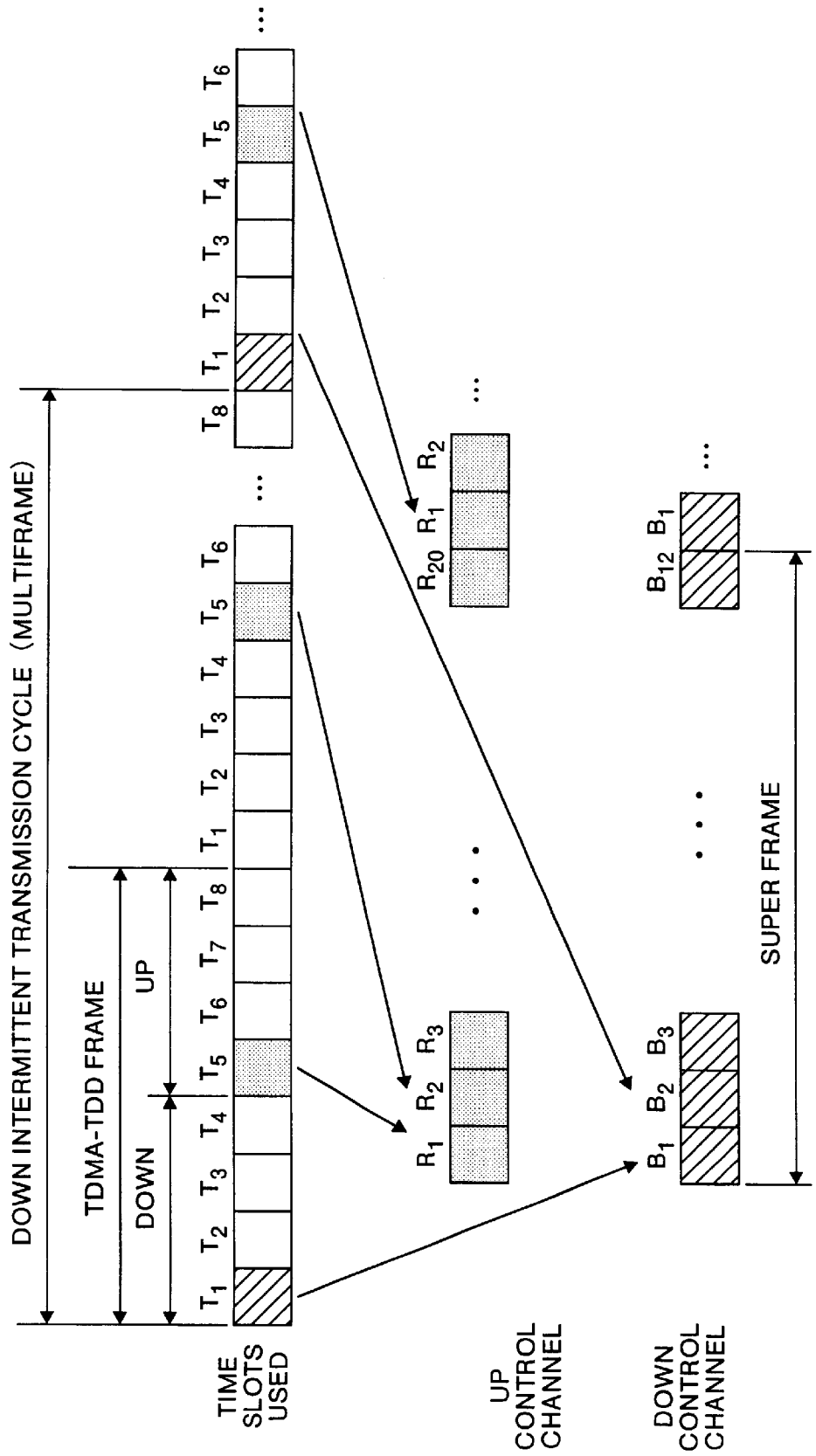
FIG. 14 is an explanatory diagram which shows the frame structure in a conventional TDMA-TDD mode.

FIG. 13 shows the TDMA-TDD frame allocation in the control channel allocation method according to the fourth embodiment. In the control channel allocation method according to the fourth embodiment, in the same way as in FIG. 12, down control channels B are placed in the first to third time slots $t_1$ to $t_3$ within a single TDMA-TDD frame formed from a plurality of time slots. Similarly, although not shown, up control channels R are placed in the fourth to sixth time slots $t_4$ to $t_6$. The remaining time slots are used as communication channels.

Namely, in a frame structure in which these six TDMA-TDD frames from 41 to 46 form one cycle, it is possible to allocate a plurality of time slots in which the same type of control channels can be placed within each TDMA-TDD frame as control channel positions for each sector cell.

Next, the TDMA-TDD frame allocation method in the control channel placement method according to the fourth embodiment will be described specifically below. Firstly, assuming the TDMA-TDD frame structure is as described above, the reception levels in each time slot within the six TDMA-TDD frames are measured, as described above in the first embodiment, and reception level registration results such as those shown in FIG. 5 are acquired.

Next, the placement of the TDMA-TDD frames and the placement of the control channels in each sector cell are decided such that time slots registered with X marks or Δ marks are avoided in the acquired registration results.

In the example shown in FIG. 13, based on the above reception level measurement results, the sector cell C1 may use the first time slot $t_1$ of the first TDMA-TDD frame 41, the second time slot $t_2$ of the second TDMA-TDD frame 42, and the first time slot $t_1$ of the fifth TDMA-TDD frame 45 as down control channels B.

The sector cell C2 may use the third time slot $t_3$ of the second TDMA-TDD frame 42, the second time slot $t_2$ of the third TDMA-TDD frame 43, and the first time slot $t_1$ of the sixth TDMA-TDD frame 46 as down control channels B.

The sector cell C3 may use the first time slot $t_1$ of the second TDMA-TDD frame 42, the first time slot $t_1$ of the fourth TDMA-TDD frame 44, and the third time slot $t_3$ of the fifth TDMA-TDD frame 45 as down control channels B.

The sector cell C4 may use the second time slot $t_2$ of the first TDMA-TDD frame 41, the second time slot $t_2$ of the fourth TDMA-TDD frame 44, and the second time slot $t_2$ of the fifth TDMA-TDD frame 45 as down control channels B.

The sector cell C5 may use the first time slot $t_3$ of the third TDMA-TDD frame 43, the third time slot $t_3$ of the fourth TDMA-TDD frame 44, and the second time slot $t_3$ of the sixth TDMA-TDD frame 46 as down control channels B.

The sector cell C6 may use the third time slot $t_3$ of the first TDMA-TDD frame 41, the third time slot $t_3$ of the third TDMA-TDD frame 43, and the third time slot $t_3$ of the sixth TDMA-TDD frame 46 as down control channels B.

In other words, each sector cell may use the hatched time slots as down control channels B. Note that, with regard to the up channels R, in the same way as for the down control channels B, each sector cell may use any one of the time slots $t_4$ to $t_6$ within each of the TDMA-TDD frames as a down control channel B based on the results of the reception measurement.

Note also that, after the above TDMA-TDD frame allocation has been completed, in a state where wireless communication has been established, the reception levels in the control channels actually placed in each sector cell are measured at regular intervals, and when the results of that measurement exceed a predetermined reception level, the TDMA-TDD frame allocation process is performed once again. Because this processing is the same as in the third embodiment, a detailed description thereof is omitted here.

As explained above, in the control channel placement method according to the fourth embodiment, a plurality of time slots capable of receiving the same type of control channel are prepared within a single TDMA-TDD frame, and different sector cells use the above control channels within the same TDMA-TDD frame. Moreover, based on the result of the measurement of the reception level in each time slot, time slots capable of receiving control channels that can be used by the same sector cell are fixed in advance across a plurality of TDMA-TDD frames from among the TDMA-TDD frames of the total number of sector cells corresponding to one cycle. Therefore, in the TDMA-TDD frame allocation processing or in the TDMA-TDD frame reallocation processing, even if one control channel becomes temporarily unusable (when viewed from the terminal station side) due to interference, other control channels that are capable of reception can be selected and used, thereby enabling high quality, stable communication to be provided in a wireless communication system.

Thus, according to the present invention, when a base station having a plurality of sector cells performs a transmission with both up control channels and down control channels placed in predetermined time slot positions within the TDMA-TDD frames for each sector cell, the reception level of each time slot extending across the TDMA-TDD frames corresponding to the number of sector cells of the base station is measured. Next, time slots in which it is possible for control channels to be placed are extracted from among the time slots extending across the TDMA-TDD frames corresponding to the number of sector cells, using the result of the measurement of the reception level when the first sector cell was measured, and the result of the measurement of the reception level when the second sector cell at a position opposite the first sector cell was measured from among all the sector cells within the same base station. Next, the TDMA-TDD frames are allocated for each sector cell such that those predetermined time slot positions in which control channels are placed, from among the time slots within the TDMA-TDD frame, are matched with the extracted time slots. As a result, both the up control channels and the down control channels can be placed simultaneously in optimum time slot positions. Consequently, in a wireless communication system, the effect is achieved that it is possible to establish stable, high quality wireless channel communication.

According to another aspect of invention, the time slot extraction step specifies those time slots, from among the time slots within the TDMA-TDD frames extending for the corresponding number of sector cells, whose reception level in a first sector cell measured in the reception level measurement step is equal to or greater than a predetermined threshold. The time slot extraction step then determines that, out of the specified time slots, those time slots whose measurement result in a second sector cell (i.e. the sector cell located opposite the first sector cell) measured in the reception level measurement step is equal to or greater than a predetermined threshold are time slots in which control channels are able to be placed in the first sector cell. As a result, it is possible to remove time slot positions that are in an unstable state due to interference and the like from being candidates for the placement of an up control channel or a down control channel.

Accordingly, it becomes possible to establish stable and high is quality wireless channel communication.

According to still another aspect of this invention, the time slot extraction step adds the result of measuring the reception level in the second sector cell (i.e. the sector cell located opposite the first sector cell) to the result of measuring the reception level in the first sector cell measured in the reception level measurement step, and determines the time slots in which control channels can be placed in the first sector cell in sequence starting from that time slot in which the value obtained from the above addition is at the minimum. Therefore, it is possible to allocate time slot positions giving a more stable state of communication as the positions for placing up control channels and down control channels. Accordingly, it becomes possible to establish stable and high quality wireless channel communication.

According to still another aspect of this invention, the TDMA-TDD frames are formed by securing a plurality of time slots positions for the respective placement of up control channels and down control channels and by placing control channels for sector cells that are different from each other in the plurality of time slot positions. When the frame allocation step allocates specific TDMA-TDD frames (namely, TDMA-TDD frames corresponding to specific sector cells), there is a prerequisite that, within TDMA-TDD frames extending for the number of the sector cells, time slots extracted in the time slot extraction step coincide with one of either time slot positions for the placement of the above control channels within the specific TDMA-TDD frames and time slot positions for the placement of the above control channels within other TDMA-TDD frames different to the specific TDMA-TDD frames. Therefore, it is possible to choose from a plurality of control channel placement positions spread across the number of TDMA-TDD frames corresponding to the number of sector cells in order to allocate TDMA-TDD frames for one sector cell, and it is also possible to select other control channels capable of reception when one control channel becomes unusable due to interference and the like (as seen from the terminal station side). Consequently, that it becomes possible to establish stable and high quality wireless channel communication.

According to still another aspect of this invention, the TDMA-TDD frames are formed by securing a plurality of time slot positions for the placement of up control channels and down control channels and, based on a reception level measurement result measured in the reception level measurement step, by placing control channels for sector cells that are different from each other in each of the plurality of time slot positions. When the frame allocation step allocates specific TDMA-TDD frames (namely, TDMA-TDD frames corresponding to specific sector cells), there is a prerequisite that, within TDMA-TDD frames extending for the number of the sector cells, time slots extracted in the time slot extraction step coincide with one of either time slot positions for the placement of the above control channels within the specific TDMA-TDD frames and time slot positions for the placement of the above control channels within other TDMA-TDD frames different to the specific TDMA-TDD frames. Therefore, it is possible to choose from a plurality of control channel placement positions spread across the number of TDMA-TDD frames corresponding to the number of sector cells in order to allocate TDMA-TDD frames for one sector cell, and it is also possible to select other control channels capable of reception when one control channel becomes unusable due to interference and the like (as seen from the terminal station side). Consequently, it becomes possible to establish stable and high quality wireless channel communication.

According to still another aspect of this invention, when a base station having a plurality of sector cells performs transmission by placing both up control channels and down control channels at predetermined time slot positions within the TDMA-TDD frames in each sector cell, the reception level in each time slot extending for the number of TDMA-TDD frames corresponding to the number of sector cells of the base station is measured. Next, time slots in which control channels can be placed are extracted from among the time slots that extend across TDMA-TDD frames of the number of sector cells using the result of the measurement of the reception levels measured in a first sector cell and the result of the measurement of the reception levels measured in a second sector cell that is located opposite to the first sector cell from among all the sector cells in the same base station. Next, with communication having been established as a result of TDMA-TDD frames allocated in each sector cell such that time slots extracted in the time slot extraction step coincide with predetermined time slot positions for the placement of control channels from among the time slots within the TDMA-TDD frames, the reception levels of time slots in which control channels have been placed in each sector cell are measured at regular intervals. If the result of this reception level measurement is equal to or greater than a predetermined threshold, the TDMA-TDD frame allocation step is performed once again. Because of such an arrangement, it is possible to avoid deterioration in the quality of communication caused by interference obstruction generated while communication is established. Consequently, it becomes possible to establish stable and high quality wireless channel communication.

According to still another aspect of this invention, because the frame allocation step is performed once again to allocate the TDMA-TDD frame to a position shifted by one time slot towards the front or rear, by attempting to establish communication each time by shifting the reallocation of the TDMA-TDD frames by one time slot forwards or backwards, it is possible to omit the calculation processing to search for time slots in which control channels are able to be placed. At the same time, the effect is achieved that it is possible to keep the time when communication cannot be established to the minimum.

According to still another aspect of this invention, the carrier to interference wave strength ratio is acquired from the reception levels measured for the time slots in which control channels have been placed, and TDMA-TDD frame reallocation can be performed in accordance with this carrier to interference wave strength ratio. Accordingly, it becomes possible to accurately determine whether or not a control channel is receiving interference obstruction.

According to still another aspect of this invention, the carrier to interference wave strength ratio is acquired from the reception levels measured when the time slots being measured in which the control channels have been placed are in a blocked state, and TDMA-TDD frame reallocation can be performed in accordance with this carrier to interference wave strength ratio. Accordingly, it becomes possible to accurately determine whether or not variations in the reception level in a control channel are only caused by interference obstruction.

According to still another aspect of this invention, because it is possible to determine that a time slot being measured in which a control channel has been placed is receiving interference obstruction if the measured carrier to interference wave strength ratio continues to be a predetermined threshold or greater for a predetermined length of time, and then perform the TDMA-TDD frame reallocation step, the effect is achieved that it is possible to accurately determine whether variations in the reception level are caused by collisions in the up control channels or by interference obstruction.

According to still another aspect of this invention, because the error detection ratio in the up control channel can be measured and the TDMA-TDD frame allocation can be performed in accordance with this error detection ratio, the effect is achieved that it is possible to determine whether the usage of the time slot of a control channel has become difficult or impossible.

The control channel placement method according to the present invention is applied to the establishment of wireless communication between a base station and a wireless terminal station in a wireless communication system having a sector zone structure using wireless terminal stations such as a vehicle telephone and a portable telephone and the like.

Numerous modifications and variations of the present invention are possible in light of the above teachings. It is therefore to be understood that within the scope of the appended claims, the invention may be practiced otherwise than as specifically described herein.

What is claimed is:

1. A control channel placement method applied to a wireless communication system, which wireless communication system having a base station having directional antennas that match placement angles of a plurality of sector cells performing communication in the TDMA-TDD mode with a plurality of terminal stations, and in which wireless communication system the up and down control channels for establishing communication by the base station with the terminal stations in each sector cell are placed in predetermined time slot positions within TDMA-TDD frames, the control channel placement method comprising:

a reception level measurement step in which a reception level of each time slot extending over the TDMA-TDD frames corresponding to the number of sector cells of the base station is measured in each of the sector cells;

a time slot extraction step in which time slots in which control channels can be placed are extracted from among the time slots extending over the TDMA-TDD frames corresponding to the number of sector cells, using a result of the measurement of the reception level in the reception level measurement step when a first sector cell was measured, and a result of the measurement of the reception level in the reception level measurement step when a second sector cell in a position opposite to the first sector cell was measured from among the sector cells; and a frame allocation step in which the TDMA-TDD frames are allocated for each sector cell such that those predetermined time slot positions in which control channels are placed, from among the time slots within the TDMA-TDD frames, are matched with time slots extracted in the time slot extraction step.

2. The control channel placement method according to claim 1, wherein, in the time slot extraction step, a time slot in which a reception level measured in the first sector cell in the reception level measurement step is equal to or less than a predetermined value, and in which a reception level measured in the second sector cell in the reception level measurement step is equal to or less than a predetermined value, is determined to be a time slot in which the control channel can be placed in the first sector cell.

3. The control channel placement method according to claim 1, wherein, in the time slot extraction step, time slots in which control channels can be placed in the first sector cell are determined in sequence starting from the time slot in which a value, determined by combining a reception level obtained in the reception level measurement step by measuring the first sector cell with a reception level obtained in the reception level measurement step by measuring the second sector cell, is at the minimum.

4. The control channel placement method according to claim 1, wherein the TDMA-TDD frames are formed by securing a plurality of time slot positions in which up control channels can be placed and a plurality of time slot positions in which down control channels can be placed and by placing in the plurality of time slot positions control channels of sector cells that are different from each other, and wherein, in the frame allocation step, within TDMA-TDD frames extending for the number of the sector cells, specific TDMA-TDD frames are allocated such that time slots extracted in the time slot extraction step coincide with either one of time slot positions for the placement of the control channels within the specific TDMA-TDD frames determined for each of the sector cells and time slot positions for the placement of the control channels within other TDMA-TDD frames different to the specific TDMA-TDD frames.

5. The control channel placement method according to claim 1, wherein the TDMA-TDD frames are formed by securing a plurality of time slot positions in which up control channels can be placed and a plurality of time slot positions in which down control channels can be placed and, based on a reception level measurement result measured in the reception level measurement step, control channels of sector cells that are different from each other are placed in a plurality of time slot positions for the placement of the control channels, and wherein, in the frame allocation step, within the TDMA-TDD frames extending for the number of the sector cells, specific TDMA-TDD frames are allocated such that time slots extracted in the time slot extraction step coincide with either one of time slot positions for the placement of the control channels within the specific TDMA-TDD frames determined for each of the sector cells and time slot positions for the placement of the control channels within other TDMA-TDD frames different to the specific TDMA-TDD frames.

6. The control channel placement method according to claim 1 further comprising:

a reception level remeasurement step for measuring, at regular intervals and for each of the sector cells, reception levels of time slots in which control channels have been placed in the frame allocation step; and a frame reallocation step for performing the frame allocation step when a reception level measured in the reception level remeasurement step is equal to or greater than a predetermined threshold.

7. The control channel placement method according to claim 6, wherein the frame allocation step performed in the frame reallocation step allocates the TDMA-TDD frame to a position shifted by one time slot towards the front or rear.

8. The control channel placement method according to claim 6, wherein, in the reception level remeasurement step, the carrier to interference wave strength ratio is measured from the reception level and, in the frame reallocation step, the frame reallocation step is performed when the carrier to interference wave strength ratio measured in the reception level remeasurement step is equal to or greater than a predetermined threshold.

9. The control channel placement method according to claim 8, wherein, in the frame reallocation step, if the carrier to interference wave strength ratio measured in the reception level remeasurement step continues to be equal to or greater than the predetermined threshold for a predetermined length of time, then it is determined that the time slot being measured is receiving interference obstruction and the frame allocation step is performed.

10. The control channel placement method according to claim 6, wherein, in the reception level remeasurement step, the carrier to interference wave strength ratio is measured from the reception level when the time slot being measured is in a blocked state, and, in the frame reallocation step, the frame reallocation step is performed when the carrier to interference wave strength ratio measured in the reception level remeasurement step is equal to or greater than a predetermined threshold.

11. The control channel placement method according to claim 10, wherein, in the reception level remeasurement step, an error detection ratio in an up control channel is measured as a reception level and, in the frame reallocation step, if the error detection ratio measured in the reception level remeasurement step is equal to or greater than a predetermined threshold the frame allocation step is performed.

* * * * *